US009337941B2

(12) United States Patent
Emerson et al.

(10) Patent No.: US 9,337,941 B2
(45) Date of Patent: May 10, 2016

(54) ANTENNA SYSTEMS AND METHODS FOR OVER-THE-AIR TRANSMITTER SIGNAL MEASUREMENT

(71) Applicant: The United States of America as represented by the Secretary of the Navy, Washington, DC (US)

(72) Inventors: David R. Emerson, Ellettsville, IN (US); Gregory D. Hughes, Dale City, VA (US); Nixon A. Pendergrass, Nashville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/746,810

(22) Filed: Jun. 22, 2015

(65) Prior Publication Data

US 2016/0050032 A1 Feb. 18, 2016

Related U.S. Application Data

(60) Provisional application No. 62/015,066, filed on Jun. 20, 2014.

(51) Int. Cl.
*H04B 17/00* (2015.01)
*H04B 17/10* (2015.01)
*H01Q 21/00* (2006.01)

(52) U.S. Cl.
CPC ......... *H04B 17/102* (2015.01); *H01Q 21/0087* (2013.01)

(58) Field of Classification Search
CPC ...... H04B 17/00; H04B 17/102; H04B 17/14; H04B 17/20; H04B 1/1027; H04B 1/0475; H01Q 21/0087; G01R 31/2806; G01R 31/2834
See application file for complete search history.

(56) References Cited

U.S. PATENT DOCUMENTS 5,057,848 A 10/1991 Rankin et al.
7,746,062 B2 6/2010 Wu et al.
(Continued)

OTHER PUBLICATIONS

Budka, T.P., et al., "A Coaxial 0.5-18GHz Near Electric Field Measurement System for Planar Microwave Circuits Using Integrated Probes", Published in IEEE transactions on Microwave Theory and Techniques, vol. 44, Issue: 12, Dec. 1996; Retrieved from Online on Apr. 28, 2015; 11 pgs; Retrieved from URL: http://ieeexplore.ieee.org/xpl/login.jsp?tp=&arnumber=556445&url=http%3A%2F%2Fieeexplore.ieee.org%2Fxpls%2Fabs_all.jsp%3Farnumber%3D556445.

*Primary Examiner* — Thanh Le
(74) *Attorney, Agent, or Firm* — Christopher A. Monsey

(57) ABSTRACT

A system adapted for use with an electromagnetic transmitter and receiver system is provided comprising an electromagnetic transmitter and receiver system comprising an antenna, wherein the electromagnetic transmitter and receiver system is adapted to produce a transmitted signal for antenna pattern measurement which is transmitted through the antenna; a case located in proximity to the electromagnetic transmitter; at least one measurement probe disposed inside the case without changing the antenna's emission pattern, wherein the case, with the probe dispose therein, is placed no closer to the antenna than a limitation on the transmitter and receiver system component comprising a dynamic range associated with radio frequency energy received by the probe from the antenna; and an output section adapted to send results from the antenna pattern measurement received by the probe to a remote location away from the transmitter and receiver system for recording and analysis, the analysis comprising producing an antenna pattern measurement for the transmitter and receiver system.

31 Claims, 19 Drawing Sheets

(56) References Cited

U.S. PATENT DOCUMENTS

| | | | |
|---|---|---|---|
| 8,415,943 B2 | 4/2013 | Dijkstra et al. | |
| 8,558,567 B2 * | 10/2013 | Mutnury | G01R 31/2806 324/500 |
| 8,610,439 B2 * | 12/2013 | Nickel | H04B 17/20 324/600 |
| 8,903,672 B2 * | 12/2014 | Gregg | H04B 17/14 702/104 |
| 9,000,989 B2 | 4/2015 | Nickel et al. | |
| 2014/0051373 A1 * | 2/2014 | Klomsdorf | H04B 1/0475 455/114.3 |
| 2014/0122049 A1 | 5/2014 | Kyosti et al. | |
| 2014/0248845 A1 * | 9/2014 | Pendergrass | H04B 1/1027 455/226.2 |

\* cited by examiner

STEP 302: PROVIDE A TX-OTA PROBE IN ACCORDANCE WITH THE INVENTION. PLACE THE PROBE WITH RESPECT TO THE DEVICE UNDER TEST BASED UPON SAID DYNAMIC RANGE CAPACITY AND THE PREDETERMINED RANGE OF OUTPUT OF SAID DEVICE UNDER TEST WHEREIN SAID TEST LOCATION PLACEMENT WILL BE WITHIN SAID RANGE SO THAT SAID TX-OTA PROBE WILL NOT RECEIVE SIGNAL OUTSIDE OF THE DYNAMIC RANGE.

STEP 304: CONNECT +12 VDC TO TEST POINT (TP) 4.

STEP 306: SET THE SIGNAL GENERATOR POWER LEVEL TO -90 DBM AND THE FREQUENCY TO A DESIRED TEST FREQUENCY

STEP 308: CONNECT THE SIGNAL GENERATOR OUTPUT TO TEST POINT 1.

STEP 310: RECORD THE VOLTAGE OUTPUT MEASURED BY OSCILLOSCOPE AT TEST POINT 2 AND TEST POINT 3.

STEP 312: REPEAT STEP 69 INCREASING THE POWER LEVEL BY 4DB UNTIL FINAL MEASUREMENT AT +14 DBM.

STEP 314: GRAPH THE POWER (DBM) VS. VOLTAGE (V) FOR EACH TEST POINT MEASURED TO GAIN A CHARACTERISTIC CURVE OF THE DEVICE.

FIG. 15

STEP 402: PROVIDE A SINGLE PRINTED CIRCUIT BOARD CAPABLE OF INTEGRATING A BROADBAND ANTENNA, A RADIO FREQUENCY ATTENUATOR/FILTER, A RADIO FREQUENCY DETECTOR, A DEMODULATING LOGARITHMIC AMPLIFIER, AND AN

STEP 404: DETERMINE AN ANTENNA DESIGN ADAPTED TO BE SMALL, UNOBTRUSIVE, AND HAVE ENOUGH GAIN TO DETECT A WIDE VARIETY OF TRANSMITTER POWER LEVELS WHEREIN THE GAIN DOES NOT MAX OUT THE DYNAMIC RANGE OF SAID DEMODULATING LOGARITHMIC AMPLIFIER.

STEP 406: DETERMINE AN AMPLIFICATION CIRCUIT USING SAID OPERATIONAL AMPLIFIER.

STEP 408: CREATE AN INTEGRATED SINGLE PRINTED CIRCUIT BOARD BY INTEGRATING SAID BROADBAND ANTENNA, RADIO FREQUENCY ATTENUATOR/FILTER, RADIO FREQUENCY DETECTOR, DEMODULATING LOGARITHMIC AMPLIFIER, AND OPERATIONAL AMPLIFIER.

STEP 410: GENERATE AN ELECTRICAL SCHEMATIC OF SAID INTEGRATED SINGLE PRINTED CIRCUIT BOARD.

STEP 412: GENERATE A BOARD LAYOUT TEST DESIGN TO DETERMINE IF OUTPUT MEETS DESIGN REQUIREMENTS BASED ON ANTENNA SIZE AND REQUIRED COMPONENTS.

FIG. 16

ANTENNA SYSTEMS AND METHODS FOR OVER-THE-AIR TRANSMITTER SIGNAL MEASUREMENT

CROSS-REFERENCE TO RELATED APPLICATIONS

The present application claims priority to U.S. Provisional Patent Application Ser. No. 62/015,066, filed Jun. 20, 2014, entitled "TRANSMITTER OVER-THE-AIR PROBE," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 103,276) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

Current methods of monitoring transmitter output powers over the air can be costly and cumbersome when it comes to testing radio frequency (RF) transmitters in the field. Existing designs are costly and not always meant to be removed from a laboratory. These issues are addressed in the present disclosure by providing a small and unobtrusive probe that is cost-efficient and capable of being placed by transmitters inside or out outside the lab.

In one embodiment of the present disclosure a system adapted for use with an electromagnetic transmitter and receiver system is provided comprising, an electromagnetic transmitter and receiver system comprising an antenna, wherein the electromagnetic transmitter and receiver system is adapted to produce a transmitted radio frequency ("RF") signal for antenna pattern measurement which is transmitted through the antenna; at least one measurement probe disposed inside a case, the at least one measurement probe including a plurality of electronic components adapted to perform one or more antenna pattern measurements such that an RF signal emission pattern of the transmitted RF signal is not actively distorted; wherein the case, with the probe dispose therein, is located at first distance from the electromagnetic transmitter, the first distance not exceeding a dynamic range associated with an energy characteristic of the RF signal provided by the electromagnetic transmitter and measured by the at least one measurement probe, wherein the dynamic range includes a threshold distance in which the transmitted RF signal is detectable by the at least one measurement probe; an output section coupled to the at least one measurement probe, the output section adapted to send results indicating the antenna pattern measurement received by the at least one measurement probe to a remote location away from the electromagnetic transmitter and receiver system for recording and analysis, the analysis comprising producing an antenna pattern measurement for the electromagnetic transmitter and receiver system; wherein the receiver is adapted to produce the antenna pattern measurement to be read by an output signal analyzer configured to record and analyze the antenna pattern measurements.

In another embodiment of the present disclosure, a method of testing a transmitter output voltage signal over-the-air ("OTA") is provided comprising, providing a device under test including a transmitter and at least one antenna; determining a dynamic range capacity of a measurement probe with respect to the device under test; determining a test location placement of the measurement probe with respect to the device under test based upon the dynamic range capacity and a predetermined range of output of the device under test wherein the test location placement is within the range such that the measurement probe will not receive a transmitted radio frequency ("RF") signal outside of the dynamic range capacity; operating the device under test and the measurement probe to produce a plurality of transmitter output voltage signals representing one or more antenna pattern measurements of an RF signal provided by the transmitter of the device under test; recording the transmitter output voltage signals using a output signal analyzer; and analyzing the recorded transmitter output voltage signals by comparing the actual transmitter output voltage signals to an expected transmitter output voltage signal to diagnose functionality of the transmitter.

In yet another embodiment of the present disclosure a method of testing a transmitter ("Tx") output voltage signal over-the-air ("OTA") is provided comprising, designing a measurement probe comprising a single printed circuit board ("PCB") comprising: an integrated broadband antenna adapted to receive a transmitted radio frequency ("RF") signal energy; an RF attenuator configured to modify an input power level of the transmitted RF signal energy; a radio frequency detector; a demodulating logarithmic amplifier configured to convert the RF signal energy received by the integrated broadband antenna to a decibel-scaled voltage signal; an operational amplifier configured to invert and upscale the decibel-scaled voltage signal of the demodulating logarithmic amplifier; and a signal analyzer adapted to analyze an output signal of the operational amplifier; providing a device under test including a transmitter and at least one antenna; determining a dynamic range capacity of a measurement probe with respect to the device under test; determining a test location placement of the a measurement probe with respect to the device under test based upon the dynamic range capacity and a predetermined range of output of the device under test, wherein the test location placement will be within the range such that the measurement probe will not receive a transmitted radio frequency ("RF") signal outside of the dynamic range capacity; operating the device under test and the measurement probe to produce a plurality of transmitter output voltage signals representing one or more antenna pattern measurements of an RF signal provided by the transmitter of the device under test; recording the transmitter output voltage signals using a output signal analyzer; and analyzing the recorded transmitter output voltage signals by comparing the actual transmitter output voltage signals to an expected transmitter output voltage signal to diagnose functionality of the transmitter.

In yet another embodiment of the present disclosure a method of testing transmitter ("Tx") output voltage signals over-the-air ("OTA") is provided comprising, providing a measurement probe disposed on printed circuit board ("PCB"); placing the measurement probe at a first distance away from a device under test wherein the first distance is based on at least one of a dynamic range capacity and a predetermined range of a radio frequency ("RF") signal provided by a transmitter of the device under test; wherein placement of the measurement probe does not exceed at least one of the dynamic range capacity and the predetermined range of the RF signal provided by the transmitter, wherein the measurement probe does not measure the transmitted RF signal if the first distance is outside of at least one of the dynamic range capacity and the predetermined range; providing a direct current voltage to a first test point on the PCB; setting a signal generator power level to −90 decibel-milliwatt ("dBm"); coupling a signal generator output to second test point on the PCB and providing an RF signal, by way of the signal generator, the RF signal having a desired frequency; recording a voltage output signal measured by a signal analyzer at a third test point and at a fourth test point, wherein the signal analyzer includes at least one of an oscilloscope, a voltmeter, a data logger, and an analog to digital converter; increasing the power level of a signal provided by the signal generator by a factor of 4 decibels ("dB") wherein at least one measurement is performed by the signal analyzer when the signal generator power level is set to +14 dBm; and producing a graph including the power with respect to the voltage for each voltage output signal measured at the third and fourth test points, the graph providing an RF signal power with respect to an RF signal voltage of the device under test.

In yet another embodiment of the present disclosure an electromagnetic transmitter and receiver system is provided comprising, a transmitter including a first antenna, the transmitter adapted to transmit a radio frequency ("RF") signal for antenna pattern measurement; an enclosure device located at a first distance from the transmitter; a receiver enclosed by the enclosure device, wherein the receiver is adapted to receive the transmitted RF signal for antenna pattern measurement; a second antenna coupled to the receiver and comprising a first section and a second section, a plurality of first conductors supported by the first section and a plurality of second conductors supported by the second section, each of the conductors having a closed portion and an open portion wherein each first conductor on the first section is electrically coupled to at least one of the second conductors on the second section; at least one measurement probe coupled to the receiver, the at least one measurement probe configured to perform antenna pattern measurement on the received RF signal without changing the emission pattern of the first and second antenna; wherein placement of the enclosure device relative to the transmitter is based on a dynamic range associated with an RF signal energy transmitted by way of the first antenna such that the enclosure device is placed in proximity to the transmitter to ensure the RF signal is capable of detection by the second antenna; and a signal output section coupled to the receiver and adapted to send data signals from the receiver to a remote location for recording and analysis, the data signals indicating the antenna pattern measurement measured by the at least one measurement probe; wherein the receiver includes at least one test point adapted to output one or more data signals corresponding to the antenna pattern measurement, the one or more data signals capable of being read by a signal analyzer.

In yet another embodiment of the present disclosure a transmitter ("Tx") Over-The-Air ("OTA") measurement probe is provided comprising, a first antenna for receiving transmitted radio frequency ("RF") signal energy, the first antenna comprising a first section and a second section, a plurality of first conductors supported by the first section and a plurality of second conductors supported by the second section, each of the conductors having a closed portion and an open portion wherein each first conductor on the first section is electrically coupled to at least one of the second conductors on the second section; a printed circuit board ("PCB") electrically coupled to the first antenna, the PCB adapted to receive transmitted RF signal energy by way of the first antenna; a receiver circuit disposed on the PCB, the receiver circuit including: an RF attenuator configured to modify the input power level of the received RF signal energy; a demodulating logarithmic amplifier ("DLA") configured to convert the received RF signal energy from the first antenna into a decibel-scaled voltage signal; an operational amplifier configured to invert and upscale the output power of the DLA; and an signal output section adapted to output one or more data signals indicating the output signal of the operational amplifier, the data signals corresponding to an antenna pattern measurement of the transmitted RF signal energy; and wherein the signal output section is further adapted to send the one or more data signals from the receiver to a remote location for recording and analysis, the data signals indicating the antenna pattern measurement; wherein the receiver circuit includes at least one test point adapted to output the one or more data signals corresponding to the antenna pattern measurement, the one or more data signals capable of being read by a signal analyzer.

In yet another embodiment of the present disclosure a method of manufacturing an integrated broadband antenna is provided comprising, providing a first antenna section including a first coupling slot; providing a second antenna section including a second coupling slot; fastening a first group of conductors to the first antenna section such that the first group of conductors are supported by the first antenna section and fastening a second group of conductors to the second antenna section such that the second group of conductors are supported by the second antenna section, a plurality of the conductors in the first and second groups each including a closed portion and an open portion; coupling, by way of the first coupling slot, the first antenna section to the second antenna section; coupling, by way of the second coupling slot, the second antenna section to the first antenna section; electrically coupling, by way of a plurality of solder joints, the plurality of conductors in the first group to the plurality of conductors in the second group, wherein each of the plurality of solder joints are intermediate the open portion of the first group of conductors and the open portion of the second group of conductors; wherein an angle between the first group of conductors and the second group of conductors does not exceed 90 degrees; and electrically coupling the first antenna section to a radio frequency ("RF") signal measuring circuit of a printed circuit board ("PCB") the measuring circuit including a measurement probe comprising: an RF attenuator configured to vary an input power level of the RF signal; a demodulating logarithmic amplifier ("DLA") configured to convert the RF signal into a decibel-scaled voltage signal; and an operational amplifier configured to invert and upscale the decibel-scaled voltage signal of the demodulating logarithmic amplifier.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 13-17 show flow charts including exemplary testing and manufacturing methods of the transmitter over-the-air probe according to one or more embodiments of the present disclosure.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

An embodiment of the invention includes a probe adapted to monitor device transmitters during field use, such as open air operation or testing. An exemplary embodiment of the present disclosure performs monitoring and accurate transmitter signal power level measurements that may be used, for example, to determine impacts of transmitter power level variances during field use or operational testing. Additionally, in the present disclosure exemplary apparatuses and methods are provided to realize a signal measurement system related to antennas. One exemplary aspect of the present disclosure includes a system adapted to remotely measure and rapidly track the signal level at the antenna input of a selected receiver in any number of environments (e.g., when that receiver is positioned on a top surface of an automobile, on a seat in a bus or in a subway tunnel). Measurements of the received signals, e.g., power level, at an antenna input of a selected receiver may be used to determine actual device antenna pattern, path loss, the impact of propagation anomalies, and other important diagnostic metrics in realistic situations well beyond artificial laboratory environments.

Figure 1:
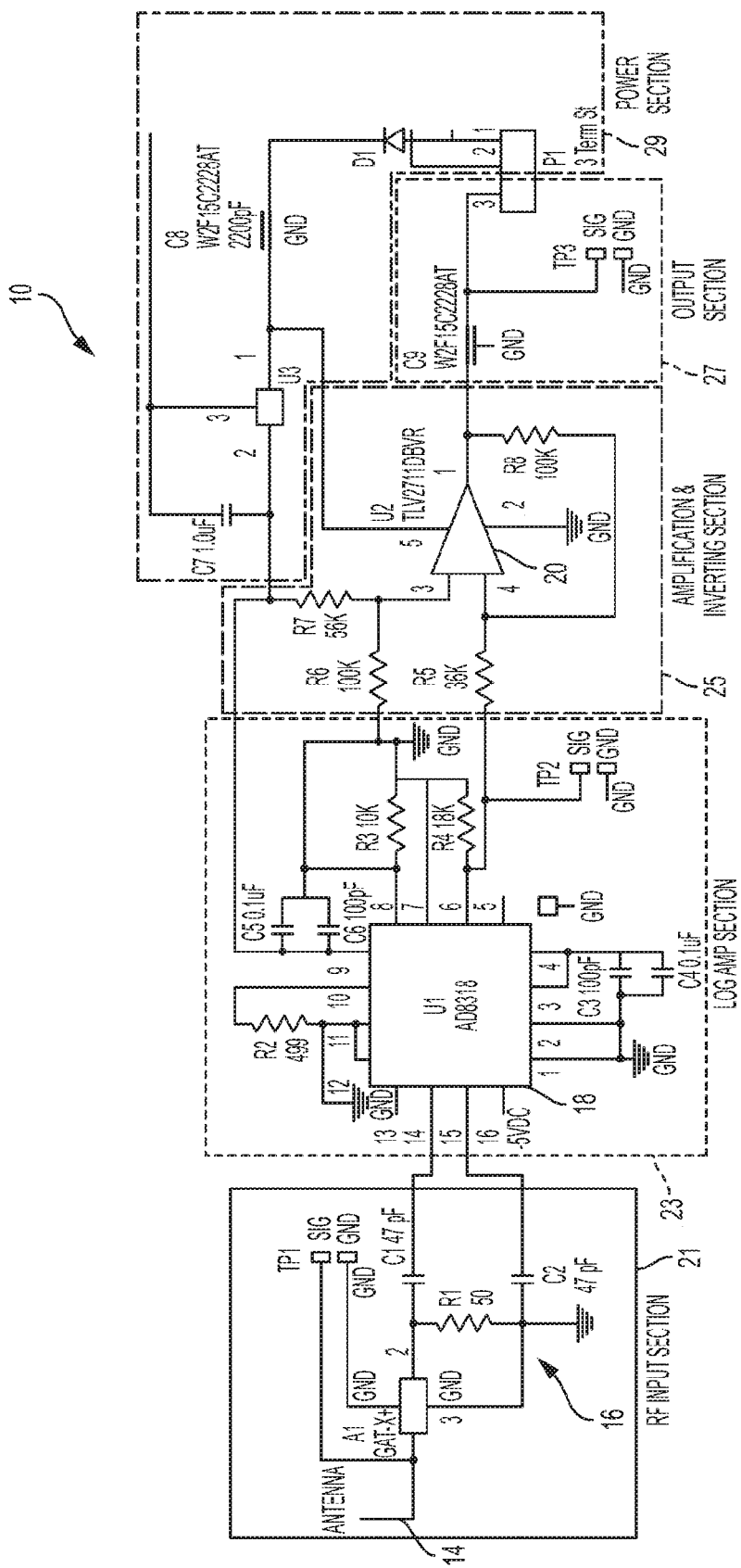
FIG. 1 shows an exemplary circuit schematic of a transmitter over-the-air probe according to the present disclosure.

Referring initially to FIG. 1, an exemplary electrical circuit schematic 12 for a transmitter ("Tx") Over-The-Air ("OTA") probe 10 is shown. In one embodiment, circuit 12 of Tx OTA 10 may be located on a single printed circuit board ("PCB") or on multiple PCB's depending on, for example, user preference, desired circuit size, or performance requirements of a particular embodiment of Tx OTA probe 10. In the illustrative embodiment of FIG. 1 circuit 12 of Tx OTA 10 includes a radio frequency ("RF") input section 21, logarithmic amplifier section 23, amplification and inverting section 25, output section 27, and power section 29. RF input section 21 generally includes an integrated PCB antenna 14 configured to receive one or more electromagnetic signals having the known characteristics of a conventional RF signal. Exemplary characteristics include a voltage characteristic and a signal power characteristic. In one embodiment, antenna 14 is an integrated broadband antenna adapted to receive transmitted RF signal energy. In the illustrative embodiment of FIG. 1, RF input section 21 may further include an RF attenuator circuit 16 configured to modify or vary the maximum input power level of the RF signal energy received by antenna 14. In one embodiment, RF attenuator circuit 16 may be designed to include a static attenuation value or, alternatively, may be designed to have a varying attenuation value which may range from any value between 0 dB-30 dB. The RF attenuation value may be chosen based on a transmitter power which may be monitored by Tx OTA probe 10. As shown in FIG. 1, RF input section 21 may further include an impedance match resistor network and one or more decoupling resistors arranged to provide signal conditioning of the RF signal received by antenna 14.

In various embodiments of the present disclosure, the original or attenuated signal output from RF input section 21 is provided as an input signal to logarithmic amplifier (hereinafter "Log Amp") section 23. Log Amp section 23 generally includes a demodulating logarithmic amplifier 18 configured to convert the RF signal received by antenna 14 and provided to log amp section 23 into a decibel-scaled voltage signal. Exemplary demodulating logarithmic amplifiers (hereinafter "Log Amp") 18 that may be used within log amp section 23 include component model number AD8318 manufactured by Analog Devices, Inc. Log Amp section 23 may further include one or more decoupling capacitors and at least two voltage doubling resistors. In one embodiment, the design of antenna 14 may be determined and adapted such that antenna 14 is unobtrusive and has enough gain to detect a wide variety of transmitter power levels, wherein the gain does not exceed a dynamic range of demodulating Log Amp 18. Amplification and inverting (hereinafter "AI") section 25 generally includes an operational amplifier ("Op Amp") 20 configured to invert and upscale or amplify the decibel-scaled voltage signal provided by log amp section 23. Exemplary operational amplifiers 20 that may be used within AI section 25 include component model number TLV2711DBVR manufactured by Texas Instruments Inc. Output section 27 includes at least one feed through capacitor and at least one multi-terminal connector. Exemplary feed through capacitors that may be used within output section 27 include component model number W2F15C2228AT manufactured by AVX Corporation. Output section 27 is generally configured to function as an output signal analyzer adapted to analyze the output signal provided by AI section 25. As described in more detail below and as known in the art, circuit 12 may be used to produce an exemplary printed circuit board ("PCB") designed to receive a plurality of components that, when coupled to the PCB, perform the RF signal conditioning and routing functions described above.

In one embodiment, RF attenuator circuit 16 may be replaced with a conventional RF filter circuit commonly known in the art. In various embodiments, during operation of Tx OTA probe 10 an exemplary output of logarithmic amplifier 18 will generally range from 0.5 VDC-2.1 VDC, wherein VDC corresponds to volts direct current or direct current voltage. In one embodiment, Tx OTA probe 10 may include a resistive network coupled to Op Amp 20 such that the combination of the resistive network and Op Amp 20 cause Log Amp 18 to produce an exemplary output of between 0.3 VDC and 9.3 VDC. In various embodiments, the VDC signal output from the resistive network and Op Amp 20 combination may be read directly using a at least one of: a conventional voltmeter, an oscilloscope or an analog to digital converter circuit. In one embodiment, the exemplary PCB includes one or more coupling points in close proximity to the output of Log Amp 18 to facilitate coupling of one or more probes used to directly read or measure the VDC signal. In another embodiment, an exemplary VDC signal output may also be read indirectly by converting the analog VDC signal to a digital form and sending/transmitting the converted signal data to be read via a computing device by way of a fiber optic cable or other known methods for digital signal transmission. Power section 29 provides power to Log Amp section 23 and the AI section 25.

In one embodiment Tx OTA probe 10 may also include one or more additional devices such as, a signal/function generator, power supply, and oscilloscope. In one aspect of this embodiment, an exemplary signal generator (not shown) is capable of generating signals ranging from 1 MHz-10 GHz, an exemplary power supply is capable of supplying +12 VDC @ 200 mA and an exemplary oscilloscope has an instrument capability comprising two channels, 100 MS/s sample rate and standard passive voltage probes with less than 4 pF capacitive loading. These additional devices may be used for testing purposes such as characterizing and completing verification tests in conjunction with an exemplary embodiment of the present disclosure. More particularly, these additional devices may be used in characterizing an output or response of Tx OTA probe 10. However, these additional devices may be combined with the components of FIG. 1 to provide various alternative or substitute embodiments to accomplish testing purposes in accordance with the present disclosure. One embodiment of the present disclosure provides a system adapted to remotely measure and rapidly track a signal level at an integrated antenna input of a receiver including an exemplary antenna such as antenna 14 and in a number of environments such as when the receiver is positioned atop a surface of an automobile, on a seat in a bus or in a subway tunnel are examples of such environments. Such measurements may be used to determine actual device antenna pattern, path loss, the impact of propagation anomalies, and other important measurable information in realistic situations well beyond artificial and costly laboratory environments.

Figure 2A:
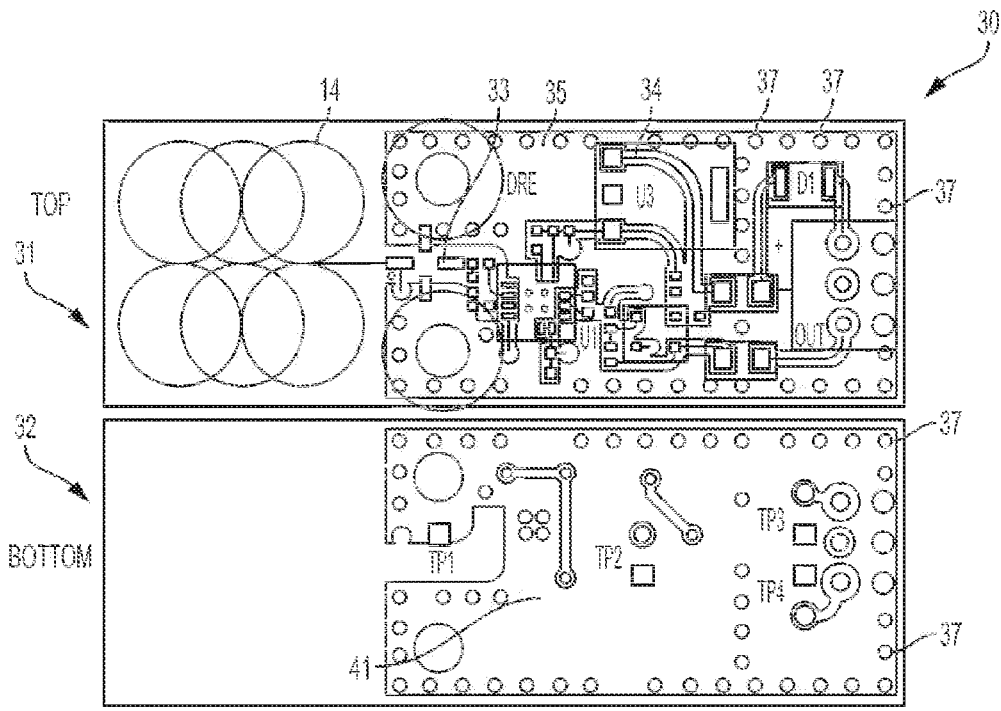
FIGS. 2A-2B show representations of an exemplary printed circuit board corresponding to the circuit schematic of FIG. 1.

FIG. 2A shows a representation of an exemplary PCB corresponding to circuit schematic 12 of FIG. 1 described above. PCB 30 generally includes a first side 31 and a second 32. In one embodiment first side 31 is the top layer of PCB 30 whereas second side 32 is the bottom layer of PCB 30. First side 31 generally includes a plurality of component placement pads 33, a plurality of copper traces 34, a ground plane 35 and a plurality of vias 37. As is known in the art, copper traces provide one or more signal paths by which electrical signals are routed from a first device installed on PCB 30 to a second device installed on or coupled o PCB 30. As noted above and as shown in the illustrative embodiment of FIG. 2A, PCB 30 may include an integrated PCB antenna 14 configured to receive one or more electromagnetic signals having the one or more known characteristics of a conventional RF signal. As is also known in the art, vias 37 provide an electrical connection between layers in a physical electronic circuit board wherein the electrical connection goes through the plane of one or more adjacent layers of the electronic circuit board or PCB 30. In one embodiment PCB 30 is a multilayered PCB including a plurality of vias comprising at least one of a through hole via, a blind via, and a buried via. In another embodiment, PCB 30 is a two layer PCB comprising only a first layer and a second layer. In various embodiments of the present disclosure PCB 30 is populated with a plurality of electronics.

Table 1 below provides a listing of components that may be used to populate PCB 30 to produce an exemplary Tx OTA probe 10 according to the present disclosure.

TABLE 1

Exemplary Tx OTA probe Component List

| Component Reference | Component Nomenclature | Value | Tolerances | Maximum Voltage Level | Manufacturer | Package |
|---|---|---|---|---|---|---|
| P1 | 1725669 | | | 63 VDC | Phoenix Contact ® | SIP |
| U1 | AD8318 | | | 5 VDC | Analog Devices ® | QFP |
| C4 C5 | Capacitor | 0.1 uF | ±10% | | | SMT 0402 |
| C7 | Capacitor | 1.0 uF | ±10% | | | SMT 0402 |
| C1 C2 | Capacitor | 47 pF | ±10% | | | SMT 0402 |
| C3 C6 | Capacitor | 100 pF | ±10% | | | SMT 0402 |
| A1 | GAT-X+ | 0-30 dB | +0.2 dB | | Mini-Circuits ® | FG873 |
| U3 | MCP1703 | | | 16 VDC | Microchip ® | SOT-223 |
| D1 | RR264M-400 | | | 400 VDC | ROHM Semiconductor ® | SOD-123 |
| R4 R3 | Resistor | 10 kΩ | ±1% | | | SMT 0402 |
| R5 | Resistor | 36 kΩ | ±1% | | | SMT 0402 |
| R1 | Resistor | 50 Ω | ±1% | | | SMT 0402 |
| R7 | Resistor | 56 kΩ | ±1% | | | SMT 0402 |
| R8 R6 | Resistor | 100 kΩ | ±1% | | | SMT 0402 |
| R2 | Resistor | 499 Ω | ±1% | | | SMT 0402 |
| U2 | TLV271IDBVR | | | 16 VDC | Texas Instruments ® | SOIC |

TABLE 1-continued

Exemplary Tx OTA probe Component List

| Component Reference | Component Nomenclature | Value | Tolerances | Maximum Voltage Level | Manufacturer | Package |
|---|---|---|---|---|---|---|
| C9 C8 | W2F15C2228AT | 2200 pF | | 50 VDC | AVX Corporation ® | SMT 0805 |

As shown in Table 1 above, P1 is a 3-pin screw terminal with a maximum voltage of 63 VDC. U1 is analog to digital converter ("AD") with a maximum operating voltage of 5 VDC. C4 and C5 are each 0.1 µF capacitors having a tolerance of +/−10%. C7 is a 1 µF capacitor having a tolerance of +/−10%. C1 and C2 are each 47 pF capacitors having a tolerance of +/−10%, while C3 and C6 are each capacitors 100 pF having a tolerance of +/−10%. A1 is an exemplary RF attenuator having an attenuation value between 0 dB and 30 dB and a tolerance of +0.2 dB. U3 is a voltage regulator with a maximum voltage input of 16 VDC and an output voltage of 5 VDC. D1 is a diode having a maximum voltage value of 400 VDC. R3 and R4 are resistors that each have a value of 10 kΩ (+/−1%). R5 is a resistor that has a value of 36 kΩ (+/−1%). R1 is a resistor that has a value of 50Ω (+/−1%). R7 is a resistor that has a value of 56 kΩ (+/−1%). R6 and R8 are resistors that each have a value of 100 kΩ (+/−1%). R2 is a resistor that has a value of 499Ω (+/−1%). U2 is a rail-to-rail operational amplifier with a maximum input voltage of 16 VDC. C9 and C8 are each feed through capacitors having 2200 pF capacitance value at 50 VDC.

Figure 2B:
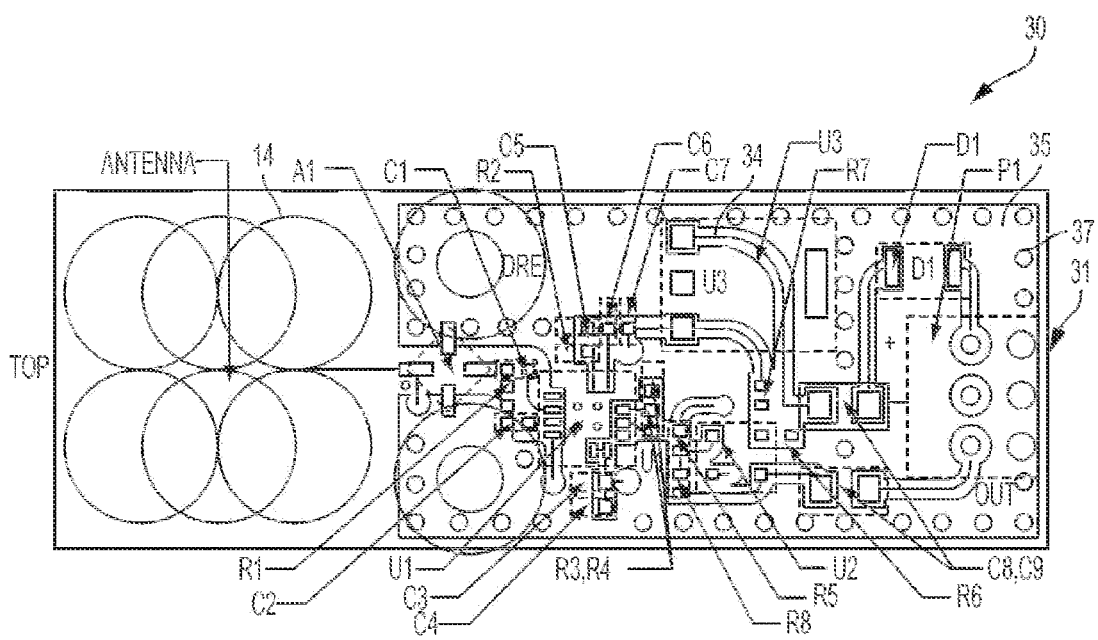

FIG. 2B shows PCB 30 including component placement in accordance with one embodiment of the present disclosure. In the illustrative embodiment of FIG. 2B the plurality of components disclosed above in Table 1 may be coupled or soldered to PCB 30 to form a fully populated PCB 30. Hence, FIG. 2B provides an illustrative identification of the physical components that comprise electrical circuit schematic 12 of FIG. 1 and the component list in Table 1. FIG. 2B also provides an illustrative representation that shows where each of the plurality of components are placed when soldered or coupled to PCB 30. The plurality of components listed within Table 1 may be populated or assembled onto PCB 30 in the following sequence: Step 1: couple U1 and A1; Step 2: couple the integrated circuits ("IC") prior to coupling smaller Surface Mount Technology ("SMT") components such as capacitors and resistors; Step 3: couple multiple components of the same type and value prior to moving to a different component; Step 4: couple smaller SMT components; Step 5: complete component installation and perform board level test. Exemplary operational requirements for Tx OTA probe 10 may be determined based on the technical specifications of the plurality of components installed on PCB 30. In one embodiment, in order to ensure accurate measurements are obtained during circuit board performance testing, Tx OTA probe 10 may utilize a supply voltage of 11 VDC-13.6 VDC (with a preferred operational supply voltage of 12 VDC) at 0.2 mA. In one aspect of this embodiment, the operational temperature range of Tx OTA probe 10 may be +40° C. to +85° C.

In one embodiment, a characterization test steps Tx OTA probe 10 through a set of power outputs from a signal generator and records the output voltage values of Tx OTA probe 10. In one embodiment, a software program may be developed to automate the manual testing process. In one aspect of this embodiment, the software program may tune a signal generator to a particular or desired frequency and power level and then record the voltage received by Tx OTA probe 10 via output section 27.

Figure 3:
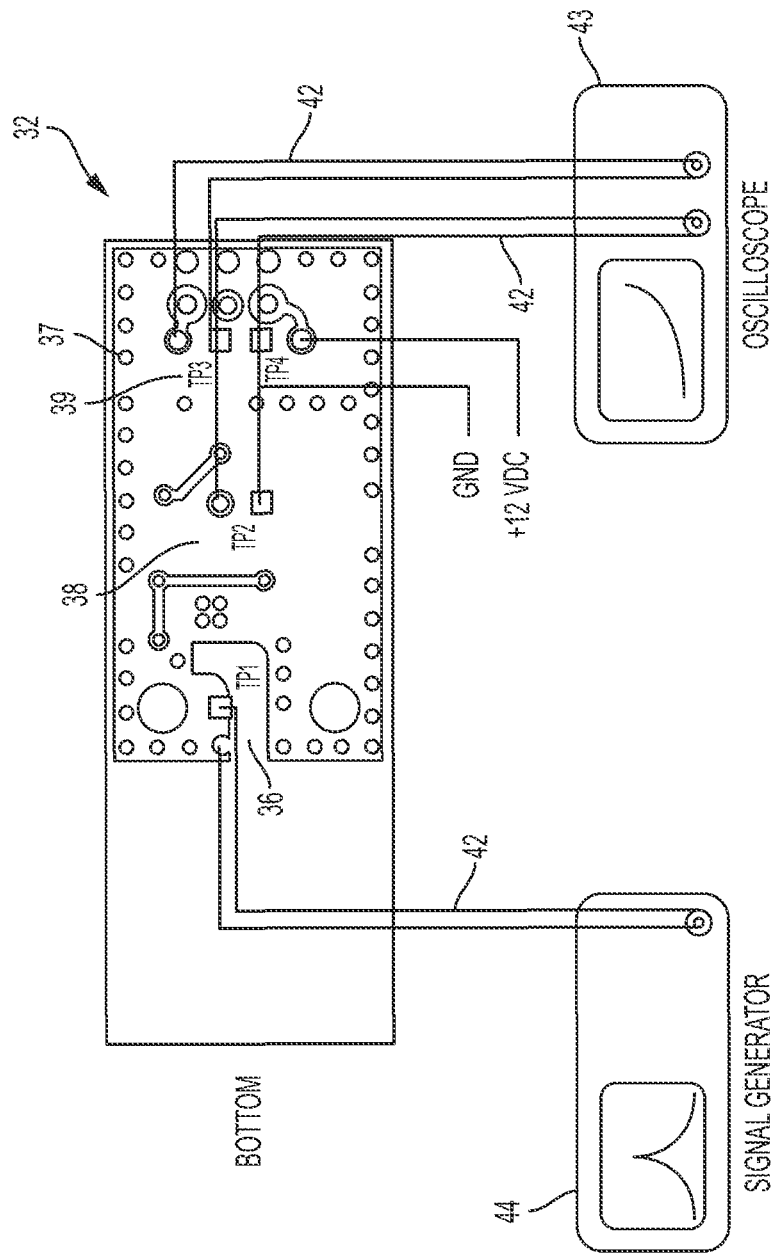
FIG. 3 shows the exemplary printed circuit board of FIG. 2A-2B coupled to one or more devices according to one embodiment of the present disclosure.
Figure 18:
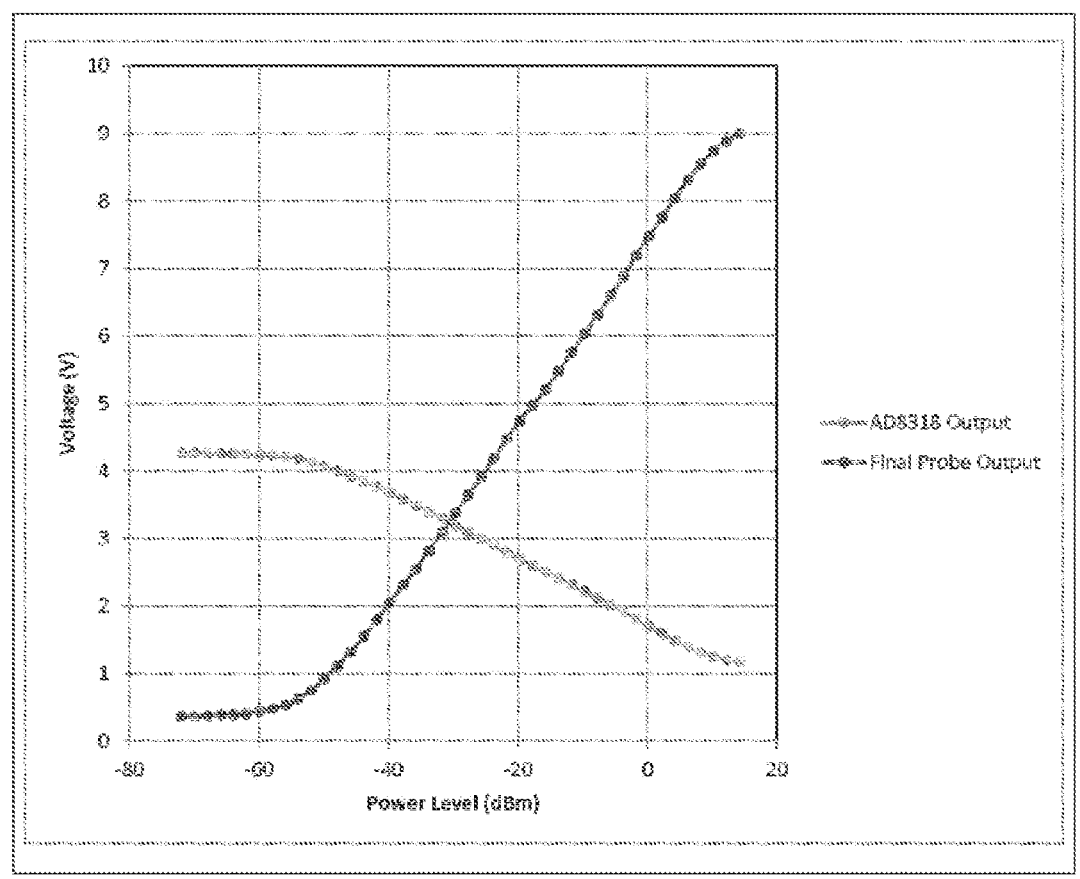
FIGS. 18 and 19 show graphs including one or more characteristics of output signals according to one or more embodiments of the present disclosure.
Figure 19:
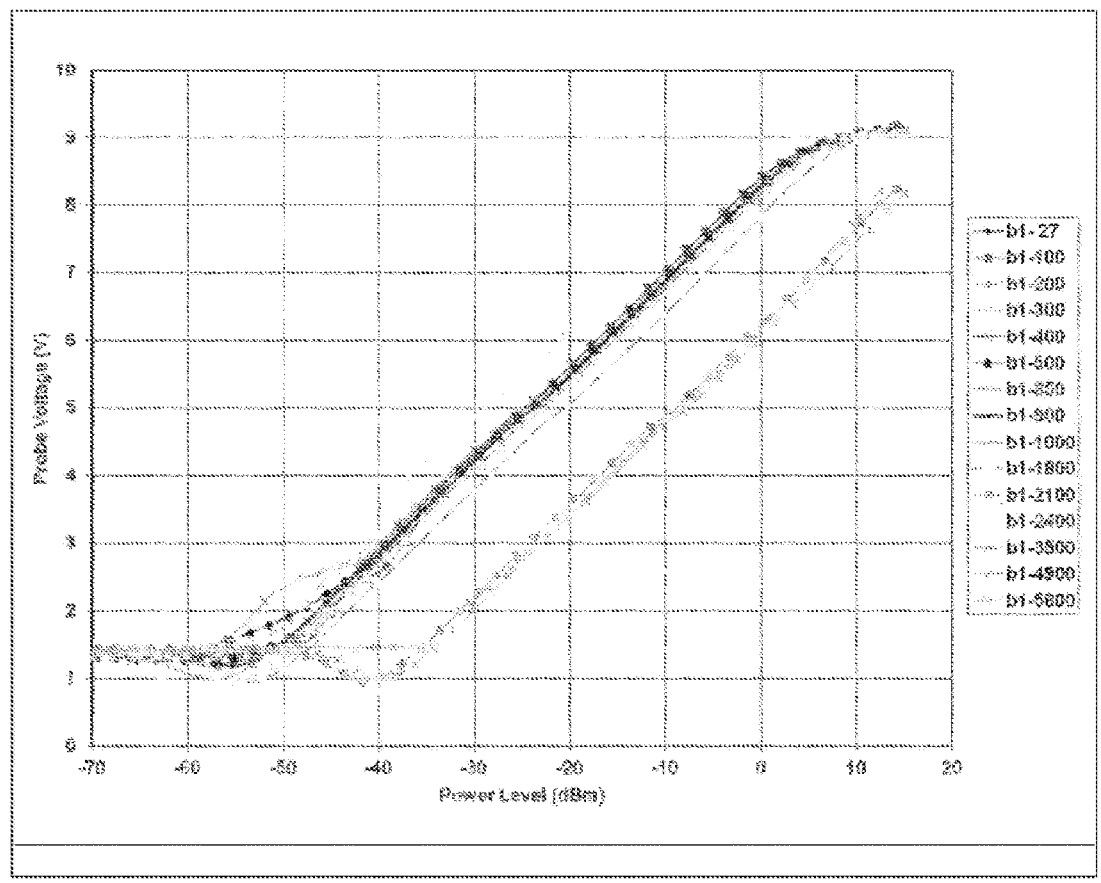

FIG. 3 illustrates a setup and connection of test equipment according to an exemplary embodiment of the present disclosure. The test setup shown in the illustrative embodiment of FIG. 3 generally includes a signal generator 44 coupled to a first input terminal 36 via, for example, a connecting cable 42 and an oscilloscope 43 coupled to a first output terminal 38 and a second output terminal 39 via connecting cable 42. The input terminals may also be referred to as test points. In one embodiment, a graph as shown in one of FIG. 18 and FIG. 19 may be produced which shows the typical output voltage of Tx OTA probe 10 versus a given RF power input in dBm. A curve depicted within the graph as shown in one of FIG. 18 and FIG. 19 may be based on a closed loop measurement of an output voltage of Tx OTA probe 10 for a given RF power input spanning various frequency ranges. In one embodiment, closed loop calibrations may serve as a way to determine relative deviations in transmitted power, thus creation of an over-the-air (OTA) calibration capability can result in use/creation of a sensor that can not only determine relative variations in transmitted power but absolute power levels as well. U.S. patent application Ser. No. 14/644,651 entitled "MINI-AUTOMATION CONTROLLER" and U.S. patent application Publication Ser. No. 14/055,760 entitled "ANTENNA RECEIVED SIGNAL STRENGTH MEASUREMENT SYSTEM WITH INTERFERENCE REDUCTION NOT AFFECTING ANTENNA PATTERN" both generally disclose systems and methods relating to receiver/transceiver systems comprising at least one antenna wherein the receiver or transceiver systems are adapted to measure, via the at least one antenna, power levels of signals provided by an exemplary transmitter device. The disclosure of U.S. patent application Ser. No. 14/644,651 and U.S. patent application Publication Ser. No. 14/055,760 are expressly incorporated by reference herein. In one embodiment of these exemplary receiver/transceiver systems, signal power level measurements are accomplished without affecting the antenna's emission pattern or receiver performance. Additionally, the systems of U.S. patent application Ser. No. 14/644,651 and U.S. patent application Publication Ser. No. 14/055,760 generally include an output section adapted to send/transmit the measured signal power levels to a remote location away from the receiver or transceiver system for recording and/or analysis.

Figure 4:
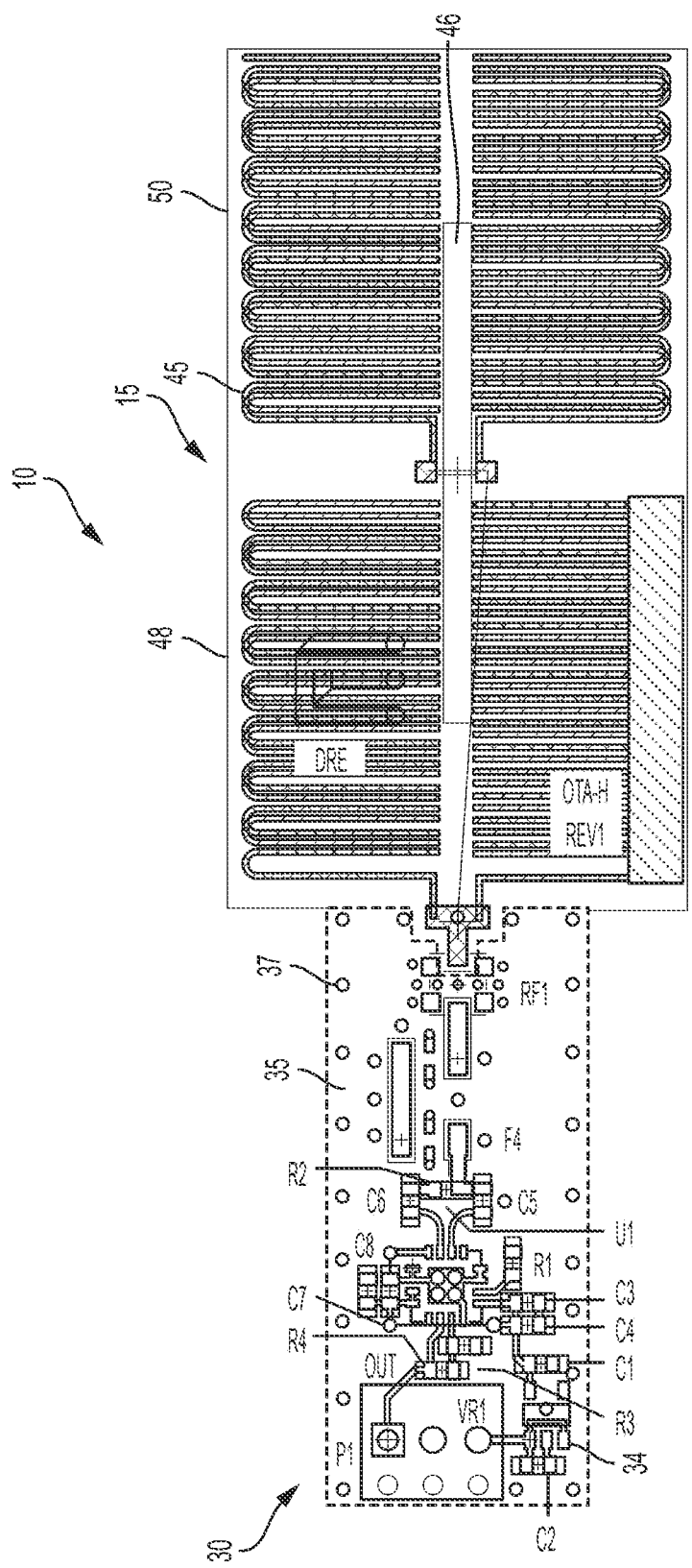
FIG. 4 shows the exemplary printed circuit board of FIG. 2A-2B coupled to an antenna device comprising one or more sections according to one embodiment of the present disclosure.
Figure 5:
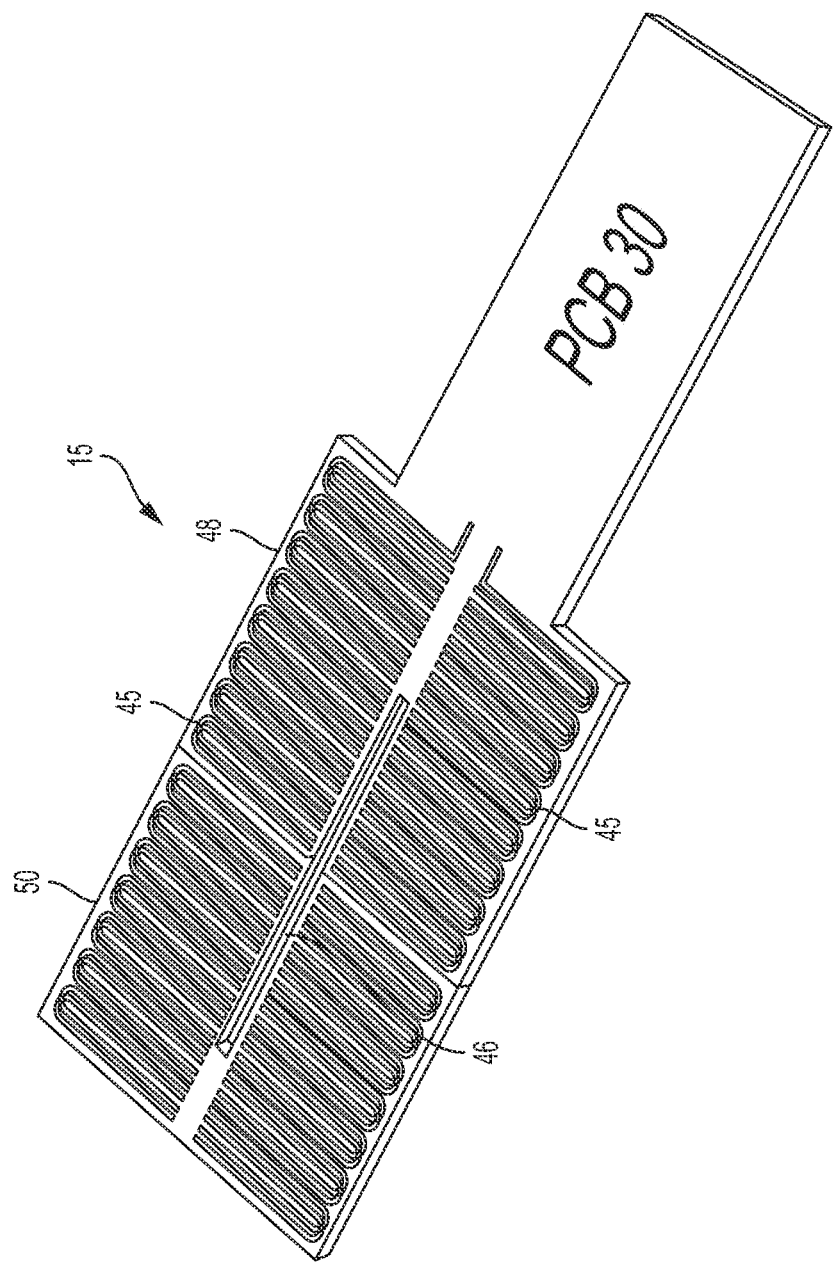
FIG. 5 shows an exemplary antenna device comprising at least a first section and a second section according to one embodiment of the present disclosure.
Figure 6:
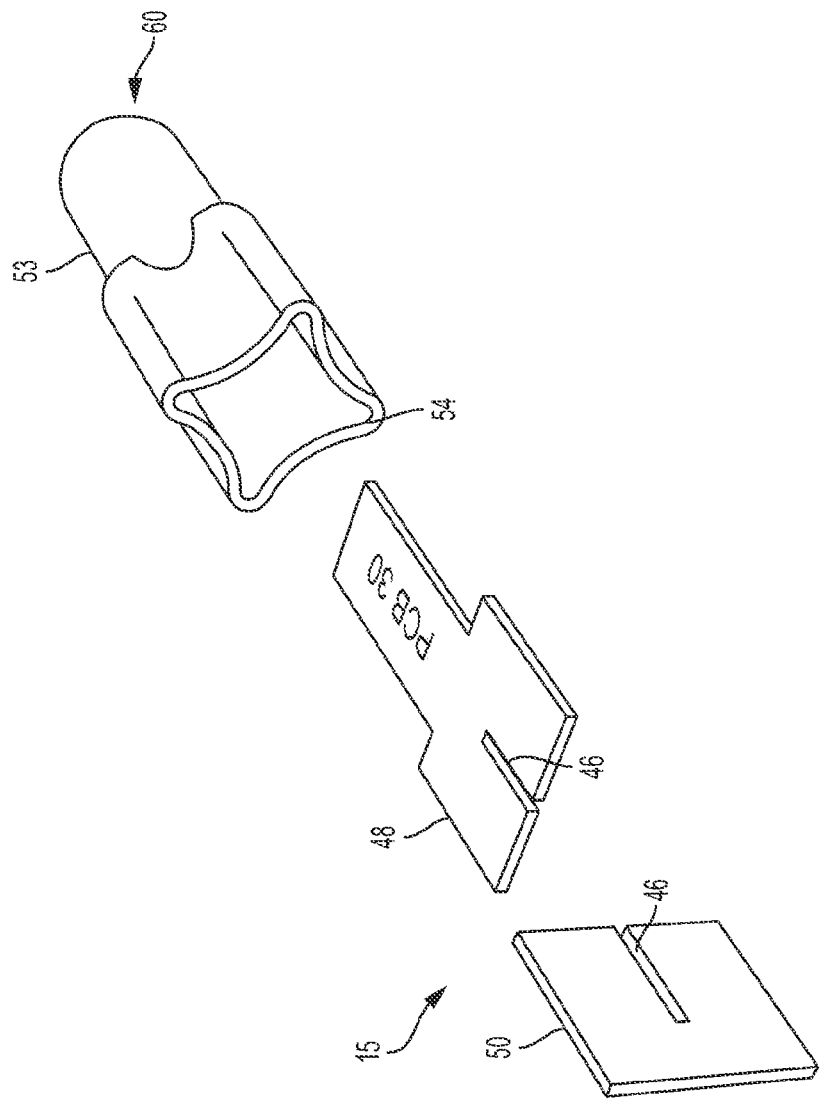
FIG. 6 shows the antenna device of FIG. 5 wherein the first section and the second section are spaced apart according to one embodiment of the present disclosure.

FIG. 4 and FIG. 5 each show PCB 30 coupled to an integrated broadband antenna 15 comprising a first section 48 and a second section 50 according to one embodiment of the present disclosure. First section 48 and second section 50 each include a coupling slot 46 and a plurality of conductors 45. Conductors 45 provide a signal path for RF signal energy measured by antenna 15 to be routed to and ultimately received by the one or more electronic components coupled to PCB 30. The illustrative embodiment of FIG. 6 shows first section 48 and second section 50 in a spaced apart configuration wherein section 50 is rotated 90° so as to interface or couple with section 48 by way of coupling slot 46. FIG. 6 further includes an enclosure device 60 comprising a first enclosure member 53 and a second enclosure member 55. First enclosure member 53 and second enclosure member 55 each include a plurality of receiving slots 54. In one embodiment, receiving slots 54 of first enclosure member 53 are adapted to receive one or more edges of first section 48 and one or more edges of second section 50. Likewise, receiving slots 54 of second enclosure member 55 are adapted to receive one or more edges of first section 48 and one or more edges of second section 50. In one aspect of this embodiment, the one or more edges received by slots 54 of first enclosure 53 are not the same as the one or more edges received by slots 54 of second enclosure 55.

Figure 7:
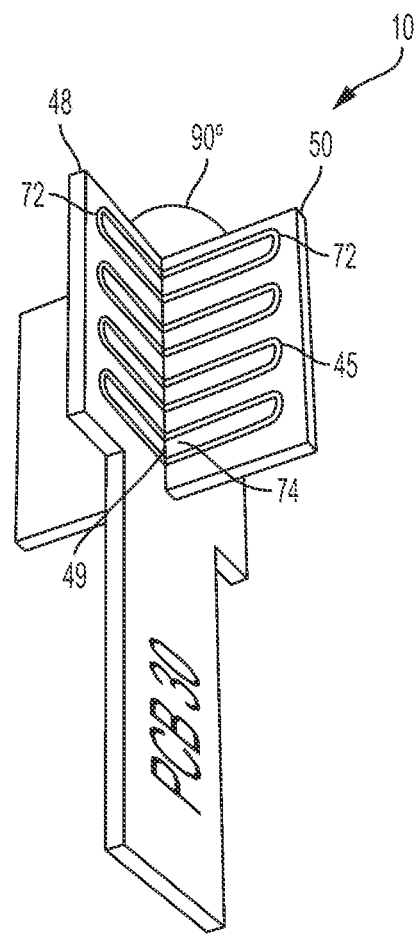
FIG. 7 shows the antenna device of FIG. 5 wherein the first section and the second section are coupled together according to one embodiment of the present disclosure.
Figure 11:
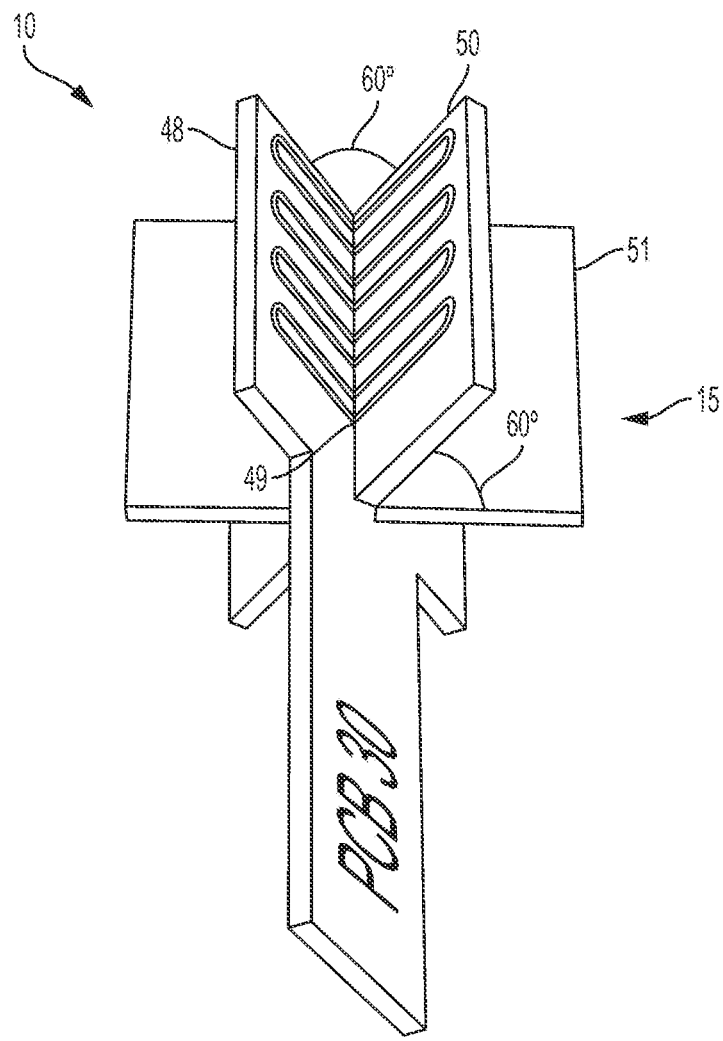
FIG. 11 shows an exemplary antenna device comprising a plurality of sections according to one embodiment of the present disclosure.
Figure 12:
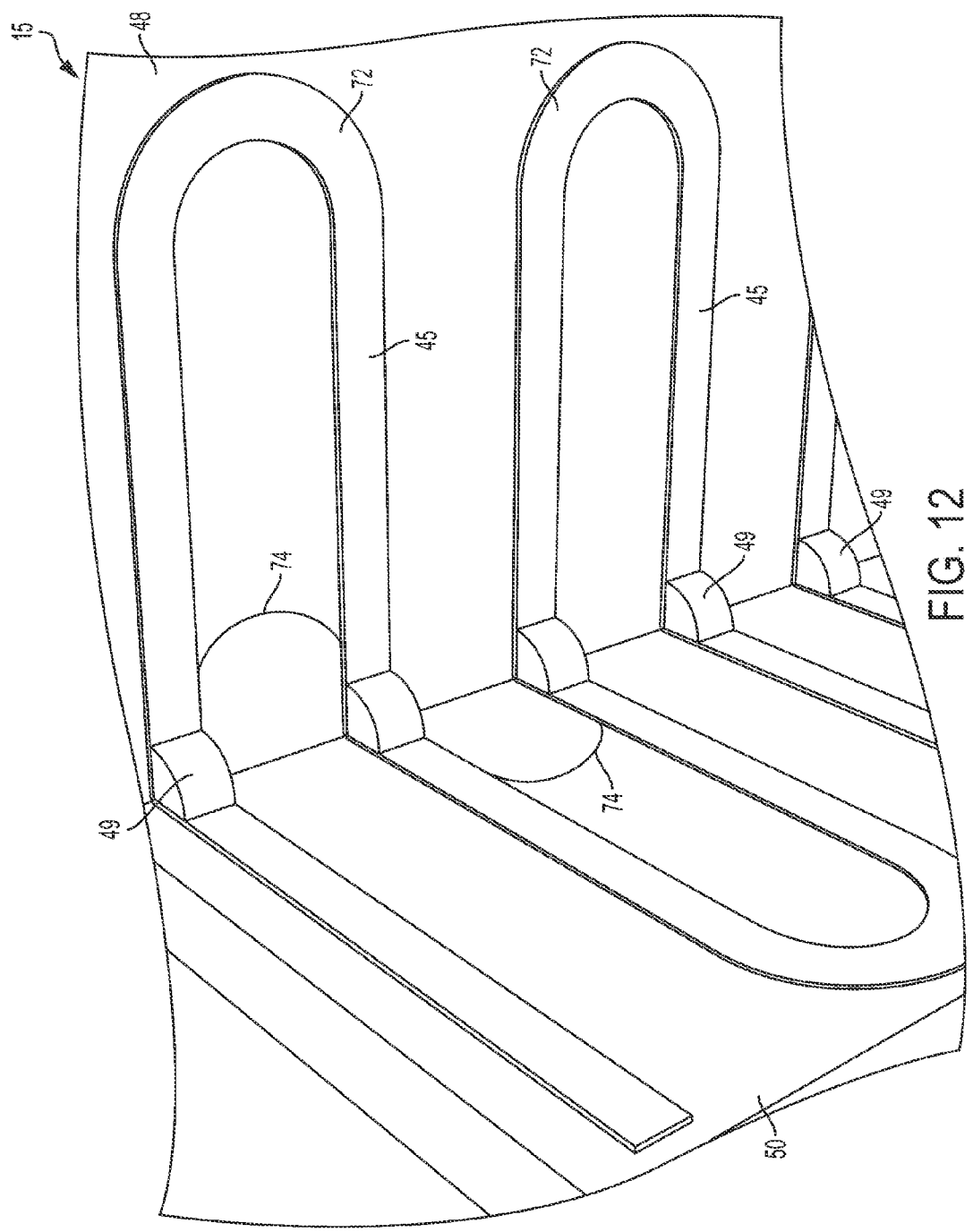
FIG. 12 shows an exemplary antenna device including one or more solder joints that facilitate coupling a first antenna section to a second antenna section according to an embodiment of the present disclosure.

The illustrative embodiment of FIG. 7 shows first section 48 coupled to second section 50 wherein section 50 is rotated 90° so as to interface or couple with section 48 by way of coupling slot 46. In one embodiment first antenna section 48 includes a top side and a bottom side and a plurality of conductors are fastened to both the top and bottom sides. Likewise, second antenna section 50 includes a top side and a bottom side and a plurality of conductors are fastened on both the top and bottom sides. As shown in the illustrative embodiment of FIG. 11 and FIG. 12, a first group of conductors fastened to first section 48 is electrically coupled to a second group of conductors fastened to second section 50. In one embodiment, a plurality of solder joints 49 facilitate electrically coupling the first group of conductors to the second group of conductors. In one aspect of this embodiment, one or more conductors in the first and second groups include a closed portion 72 and an open portion 74 and each of the plurality of solder joints are disposed intermediate open portion 74 of the first group of conductors and open portion of the second group of conductors.

Figure 8:
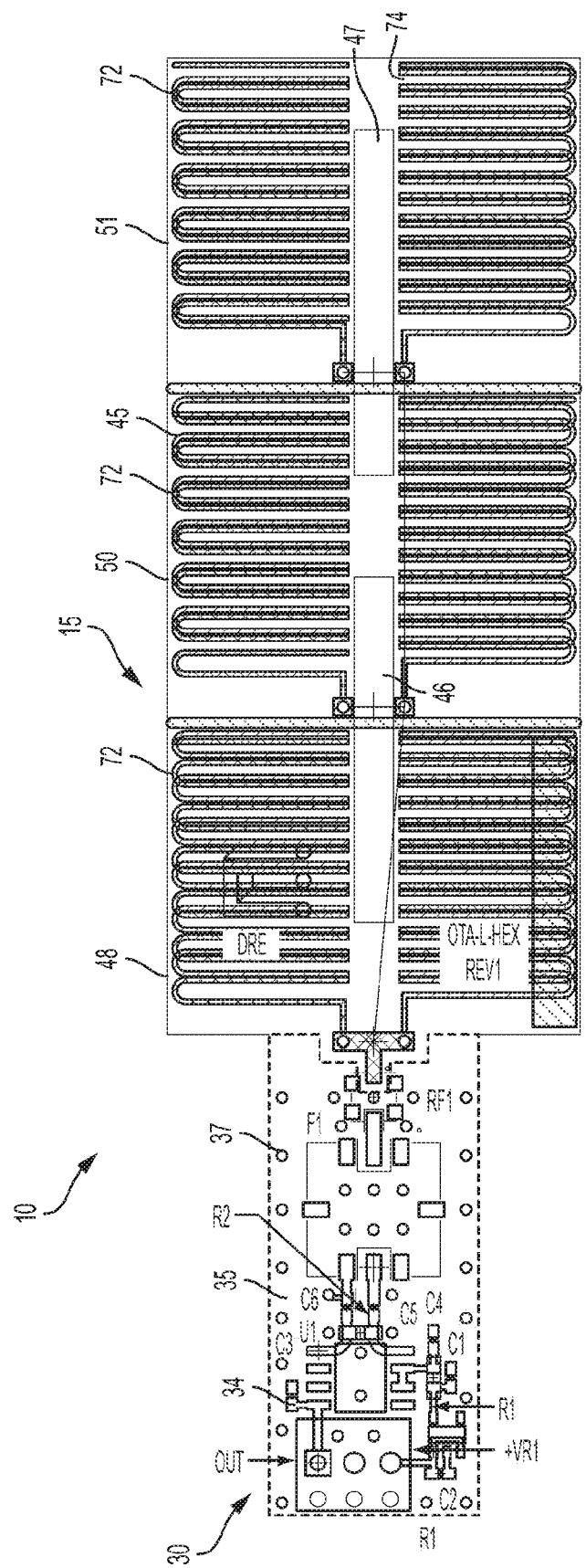
FIG. 8 shows the exemplary printed circuit board of FIG. 2A-2B coupled to an antenna device comprising one or more sections according to one embodiment of the present disclosure.
Figure 9:
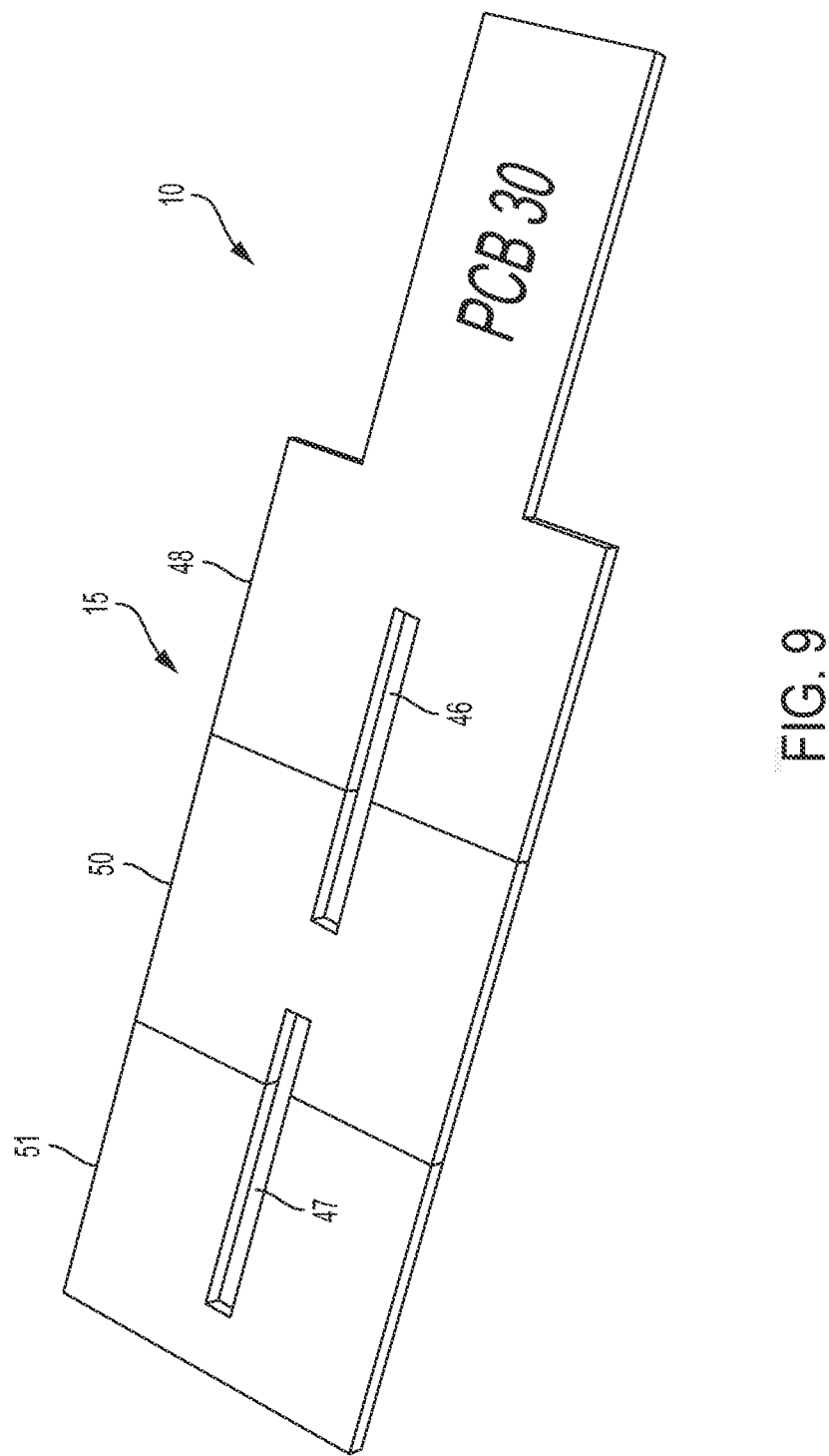
FIG. 9 shows an exemplary antenna device comprising at least a first section, a second section, and a third section according to one embodiment of the present disclosure.
Figure 10:
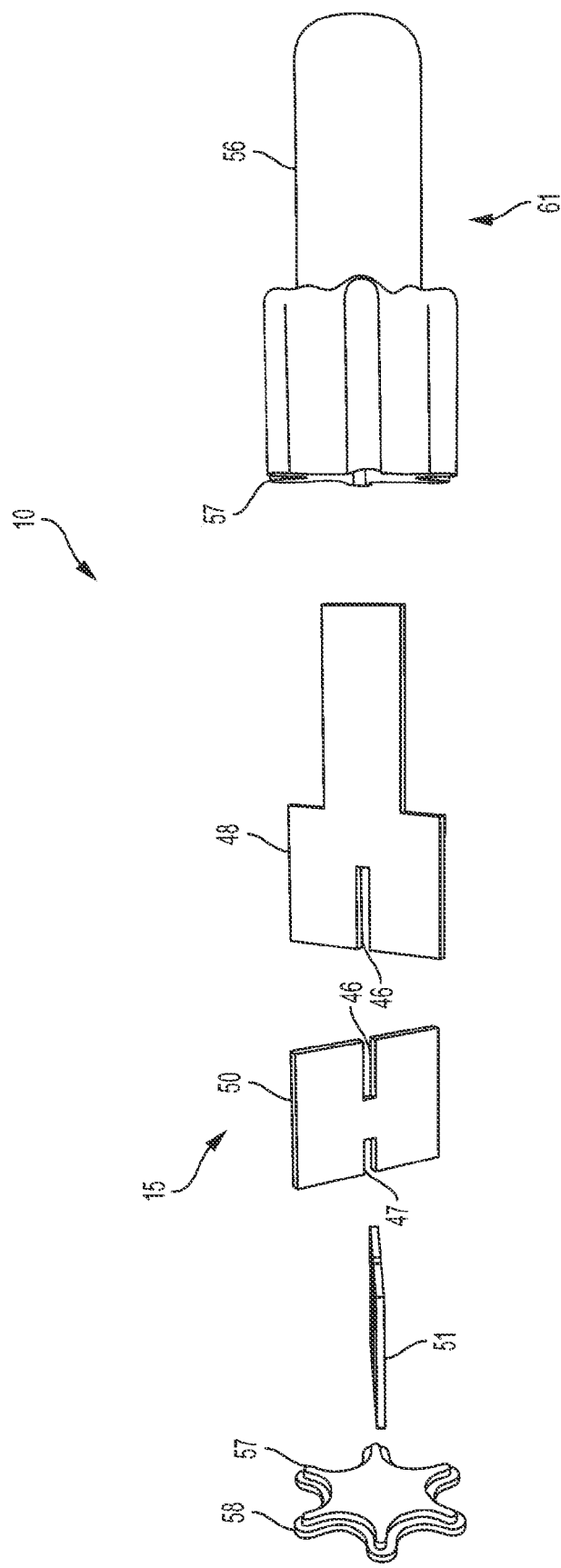
FIG. 10 shows the antenna device of FIG. 9 wherein the first section, the second section and the third section are spaced apart according to one embodiment of the present disclosure.

FIG. 8-FIG. 10 each show PCB 30 coupled to an integrated broadband antenna 15 comprising a first antenna section 48, a second antenna section 50, and a third antenna section 51 according to one embodiment of the present disclosure. Third section 51 includes a coupling slot 47 and a plurality of conductors 45, wherein coupling slot 47 facilitates coupling third section 51 to first section 48 and second section 50. The illustrative embodiment of FIG. 10 shows first section 48, second section 50 and third section 51 in a spaced apart configuration wherein section 50 is rotated so as to interface or couple with section 48 by way of coupling slot 46. Likewise, section 51 is rotated so to interface or couple with section 48 and section 50. As shown in the illustrative embodiment of FIG. 11, when the first, second and third sections are coupled to each other, the edges or blades of each antenna section may be evenly radially spaced apart such that the angle between the edge/blade of the third section and the first section is 60° and the angle between third section and second section is 60°. FIG. 10 further includes an enclosure device 61 comprising a first enclosure member 56 and a second enclosure member 58. First enclosure member 56 and second enclosure member 58 each include a plurality of receiving slots 57. In one embodiment, receiving slots 57 of first enclosure member 56 are adapted to receive one or more edges of first section 48, second section 50 and third section 51. Likewise, receiving slots 57 of second enclosure member 58 are adapted to receive one or more edges of first section 48, second section 50 and third section 51. In one aspect of this embodiment, the one or more edges received by slots 57 of first enclosure 56 are not the same as the one or more edges received by slots 57 of second enclosure 58.

In one embodiment, third section 51 includes a top side and a bottom side and a plurality of conductors are fastened to both the top and bottom sides. As discussed herein above, a third group of conductors fastened to third section 51 may be electrically coupled to the first group of conductors fastened to first section 48. Likewise, the third group of conductors fastened to third section 51 may be electrically coupled to the second group of conductors fastened to second section 50. In one embodiment, a plurality of solder joints 49 facilitate electrically coupling the third group of conductors to the first and second groups of conductors. In one aspect of this embodiment, one or more conductors in the first, second and third groups include a closed portion 72 and an open portion 74 and each of the plurality of solder joints are disposed between or intermediate open portion 74 of two different groups of conductors. In one embodiment, each of the plurality of solder joints are at least one of: intermediate open portion 74 of the third group of conductors and open portion 74 of the first group of conductors, and intermediate open portion 74 of the third group of conductors and open portion 74 of the second group of conductors. In another embodiment the antenna 15 is a quad-band antenna when the first antenna section is coupled to the second antenna section and a hex-band antenna when the third antenna section is coupled to the first and second antenna sections.

In one embodiment of the present disclosure, Tx OTA probe 10 may be positioned at a first distance from an exemplary transmitter device that is configured to transmit one more conventional RF signals over a wide frequency range. In this embodiment, the exemplary transmitter device may also be referred to as the device under test, wherein Tx OTA probe 10 is utilized to test and/or verify functionality of the transmitter/device under test by measuring, via for example antenna 14 or 15, the power level of one more signals transmitted by the device under test.

Figure 13:
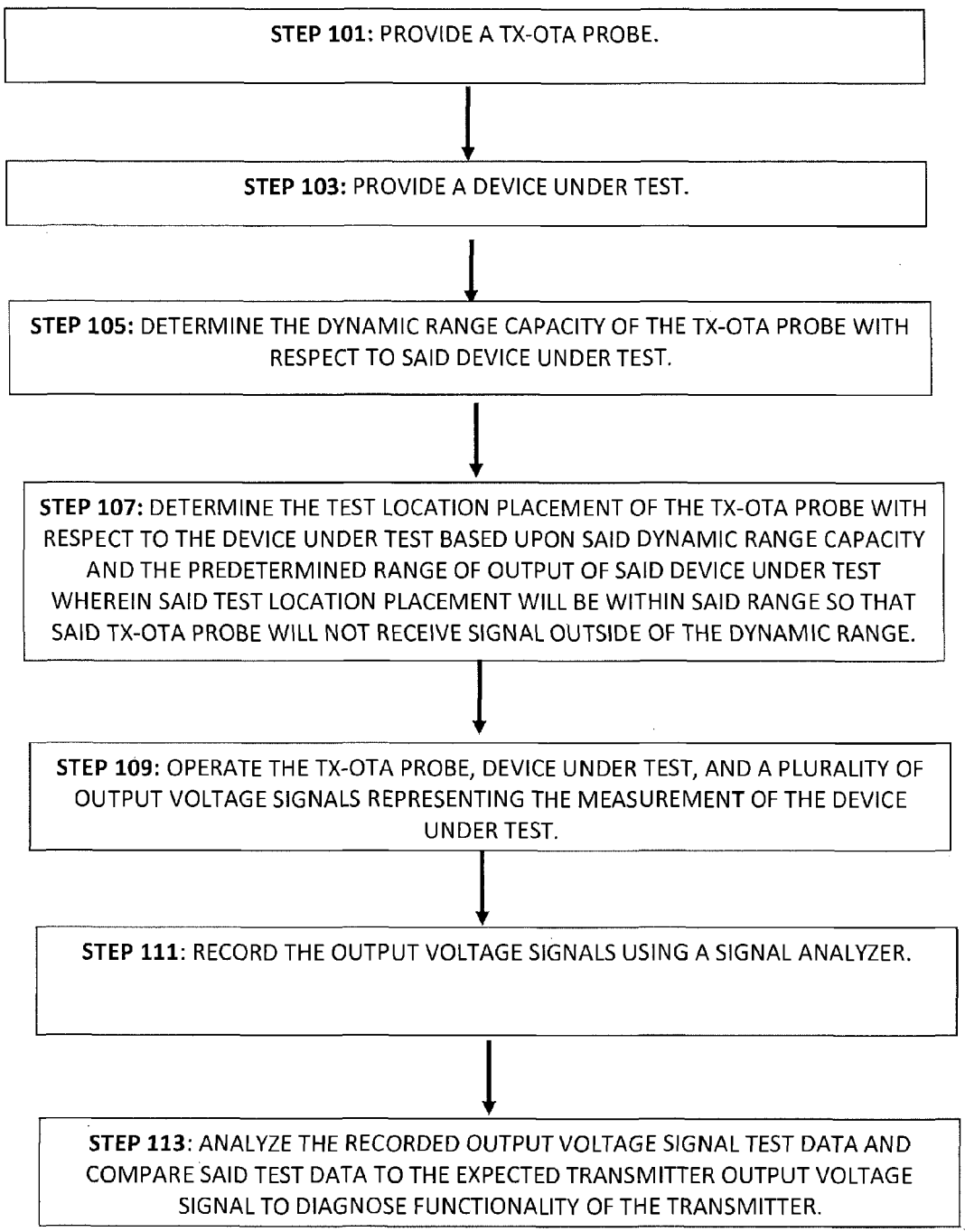

In the illustrative embodiment of FIG. 13, an exemplary method of testing the device under test's transmitter output RF signal power over the air may include a plurality of steps as disclosed herein. One exemplary method of testing may generally include the following: Step 101: provide a Tx OTA probe 10; Step 103: provide a device under test/transmitter; Step 105: determine a dynamic range capacity of Tx OTA probe 10 with respect to the device under test; Step 107: determine the test location placement of elements of Tx OTA probe with respect to the device under test based upon the determined dynamic range capacity and the predetermined range of output of the device under test wherein the test location placement will be within a range such that Tx OTA probe 10 will not receive signal outside of the dynamic range and, for example, exceed electrical limitations or specifications of Tx OTA probe 10; Step 109: operate Tx OTA probe 10, device under test, and generate a plurality of output voltage signals, via Tx OTA probe 10, corresponding to one more RF signals transmitted by the device under test; Step 111: Record the output voltage signals using a signal analyzer as recorded output voltage signal test data; Step 113: Analyze the recorded output voltage signal test data and compare the test data to the expected transmitter output voltage signal to perform analysis of on the device under test by, for example, diagnosing functionality of the transmitter or analyzing the transmitter's output power.

Figure 14:
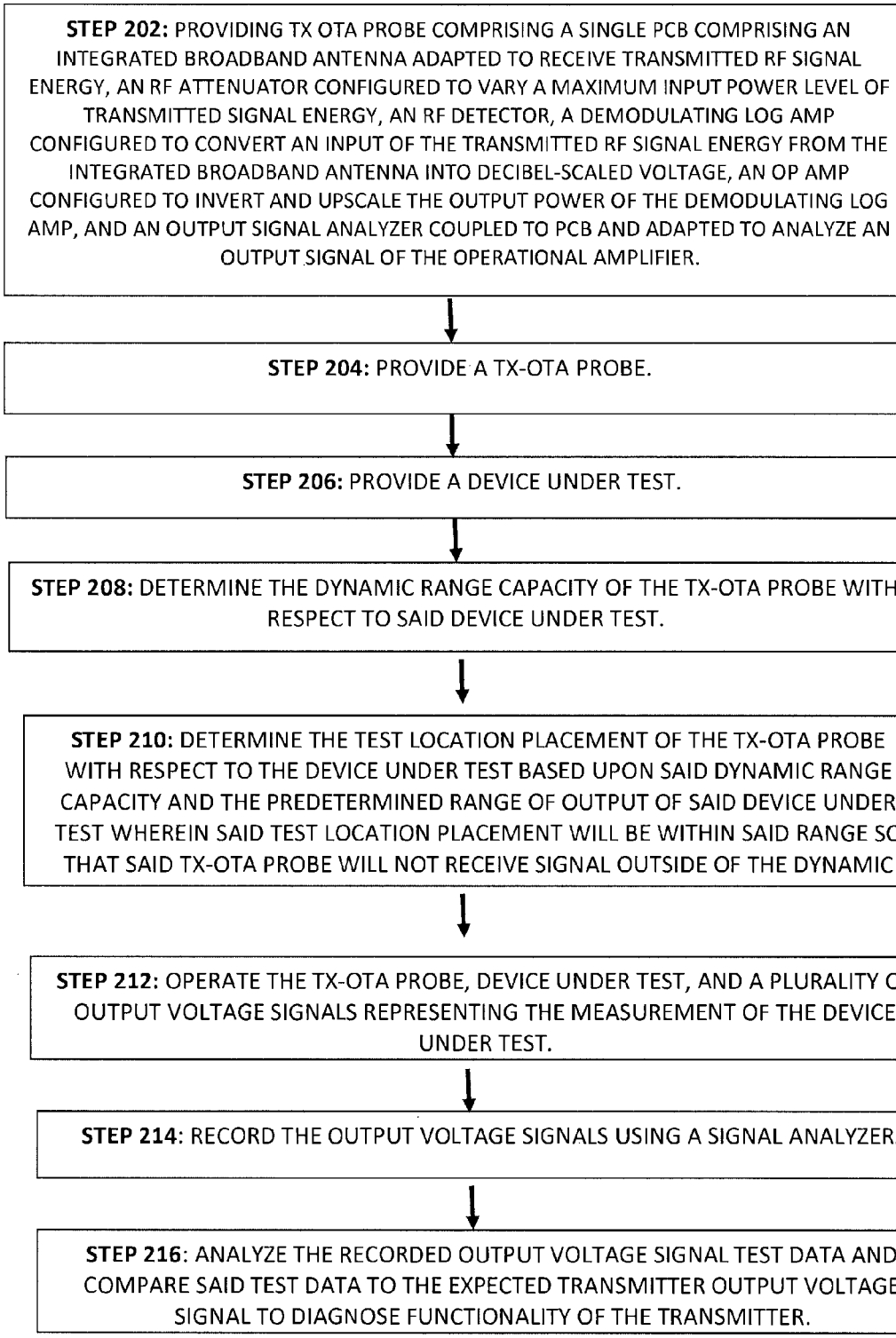

In the illustrative embodiment of FIG. 14, another exemplary method of testing the device under test's transmitter output RF signal power over the air may include a plurality of steps as disclosed herein. Hence, a second exemplary method of testing may generally include the following: Step 202: providing Tx OTA probe 10 comprising a single PCB comprising an integrated broadband antenna adapted to receive transmitted RF signal energy, an RF attenuator configured to vary a maximum input power level of transmitted signal energy, an RF detector, a demodulating Log Amp configured to convert an input of the transmitted RF signal energy from the integrated broadband antenna into decibel-scaled voltage, an Op Amp configured to invert and upscale the output power of the demodulating Log Amp, and an output signal analyzer coupled to PCB and adapted to analyze an output signal of the operational amplifier; Step 204: provide Tx OTA probe 10 comprising, for example, the plurality of components discussed herein; Step 206: provide a device under test; Step 208: determine a dynamic range capacity of the Tx OTA probe with respect to the device under test; Step 210: determine the one or more location placement(s) of Tx OTA probe 10 components with respect to the device under test based upon the dynamic range capacity and the predetermined range of output of the device under test wherein the test location placement will be within a range such that the Tx OTA probe will not receive signal outside of the dynamic range; Step 212: operate Tx OTA probe 10, device under test, and generate a plurality of output voltage signals, via Tx OTA probe 10, corresponding to one more RF signals transmitted by the device under test; Step 214: record the output voltage signals using a signal analyzer; Step 216: analyze the recorded output voltage signal test data and compare the test data to the expected transmitter output voltage signal to diagnose functionality of the transmitter.

In the illustrative embodiment of FIG. 15 an exemplary method of testing the device under test's transmitter output RF signal power over the air may include a plurality of steps as disclosed herein. Hence, a third exemplary method of testing may be related to recording of the test data and the method may generally include the following: Step 302: provide a Tx OTA probe 10 in accordance with the present disclosure and place Tx OTA probe 10 at a first distance from the device under test based upon a dynamic range capacity and a predetermined range of output of the device under test wherein Tx OTA probe 10 location placement will be placed with respect to the device under test such that Tx OTA probe 10 will not receive signal outside of a determined dynamic range. Tx OTA probe 10 components are connected with or placed in proximity to test points (TP) determined based on, for example, proximity to device under test components of interest but no closer than a distance that would result in test measurements which would exceed the dynamic range of Tx OTA probe 10. In one embodiment of the present disclosure, an exemplary TP may include one of: TP 1, TP 2, TP 3, and TP 4 as well as other exemplary TP as described herein below; Step 304: connect +12 VDC to TP 4; Step 306: set signal generator 44 power level to −90 dBm and frequency to a desired test frequency; Step 308: connect signal generator 44 output to TP 1; Step 310: record voltage output measured by oscilloscope 43 at TP 2 and TP 3; Step 312: repeat Step 310 increasing the power level by 4 dB until final measurement at +14 dBm; Step 314: graph or plot the power (dBm) vs. voltage (V) for each TP measured to gain a characteristic curve of the device under test.

In the illustrative embodiment of FIG. 16, an exemplary method of producing and designing Tx OTA probe 10 in accordance with the present disclosure may include one or more steps as follows: Step 402: provide components including a single PCB capable of integrating a broadband antenna 15, a radio frequency attenuator/filter, a demodulating logarithmic amplifier, and an operational amplifier; Step 404: determine an antenna design adapted to be small, unobtrusive, and have enough gain to detect a wide variety of transmitter power levels wherein the gain does not exceed a dynamic range of the demodulating logarithmic amplifier; Step 406: determine an amplification circuit using the operational amplifier; Step 408: create an integrated single PCB based device by integrating the broadband antenna, radio frequency attenuator/filter, radio frequency detector, demodulating logarithmic amplifier, and operational amplifier; Step 410: generate an electrical schematic of the integrated single PCB device; Step 412: generate a board layout test design to determine if the PCB device and its components output the desired electronic signals to meet predetermined design requirements based on factors comprising antenna size and required components. In one embodiment, the predetermined design requirements may also include, for example, the one or more factors recited herein below.

Figure 17:
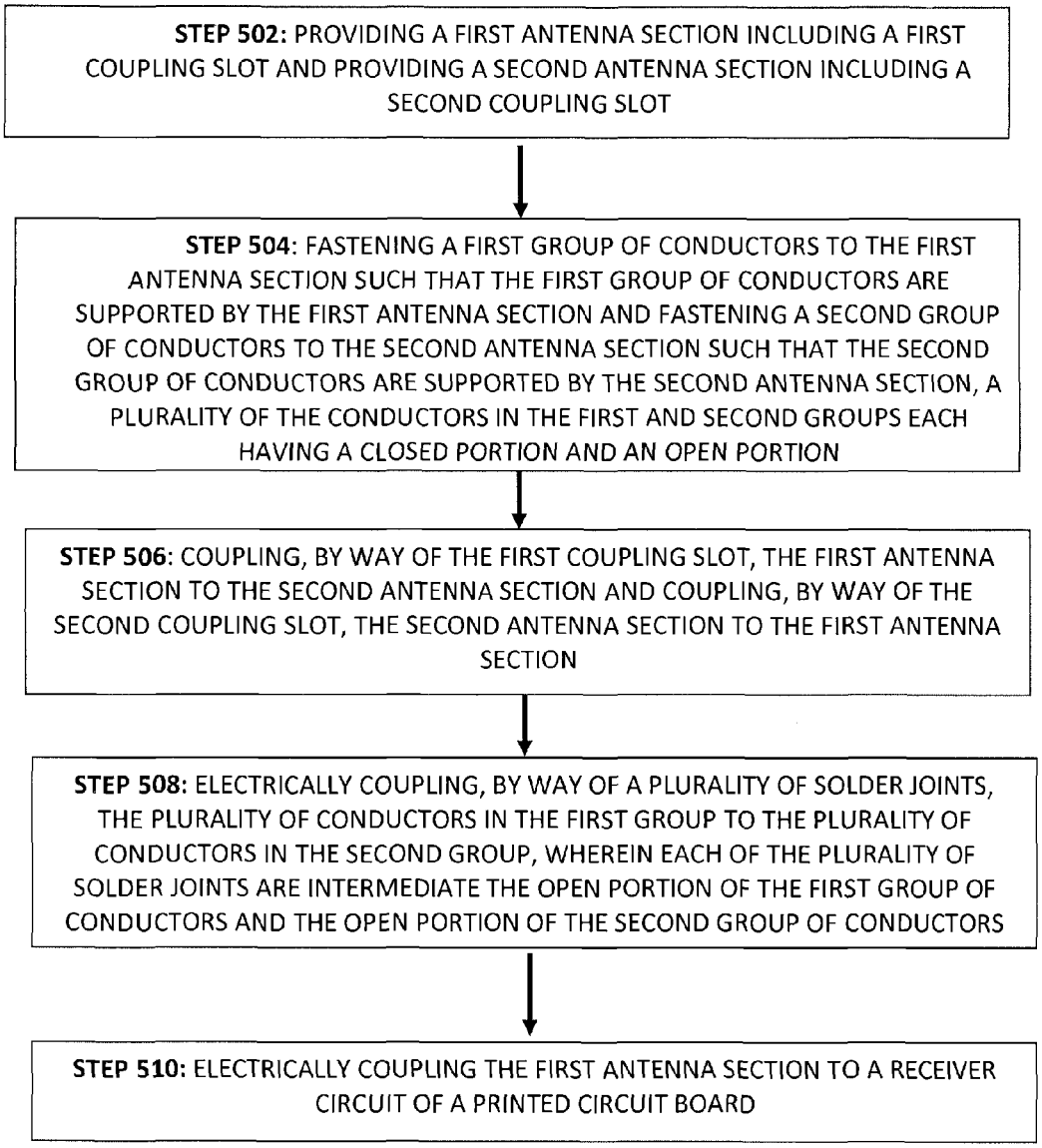

In the illustrative embodiment of FIG. 17, an exemplary method of manufacturing an integrated broadband antenna such as antenna 15 in accordance with the present disclosure may include one or more steps as follows: Step 502: providing a first antenna section 48 including a first coupling slot 46 and providing a second antenna section 50 including a second coupling slot 46; Step 502: fastening a first group of conductors to first antenna section 48 such that the first group of conductors are supported by first antenna section 48 and fastening a second group of conductors to second antenna section 50 such that the second group of conductors are supported by second antenna section 50, a plurality of the conductors in the first and second groups each having a closed portion 72 and an open portion 74; Step 506: coupling, by way of first coupling slot 46, first antenna section 48 to second antenna section 50 and coupling, by way of second coupling slot 46, second antenna section 50 to the first antenna section 48; Step 508: electrically coupling, by way of a plurality of solder joints 49, the plurality of conductors in the first group to the plurality of conductors in the second group, wherein each of the plurality of solder joints are intermediate open portion 74 of the first group of conductors and open portion 74 of the second group of conductors; and Step 510: electrically coupling first antenna section 48 to a receiver circuit of a PCB 30.

The following performance criteria may apply to an exemplary embodiment of Tx OTA probe 10 in accordance with the present disclosure. In one embodiment, Tx OTA probe 10 may provide an output signal that ranges in values from −0.3 VDC to +10 VDC. A linear region of Tx OTA probe 10 in which operation may take place can be characterized by specific minimum and maximum power values given in a testing characterization curve. In one embodiment, an exemplary safe operating range of Tx OTA probe 10 may be the range of output voltages that occur when Tx OTA probe 10 is operating in a linear monotonic region. Regarding the output of Log Amp section 23, when an exemplary characterization is complete and the data has been plotted, a straight line curve fit for the linear portion only of the data may yield a slope of approximately 0.048+/−0.004 V/dB. This slope should remain the same regardless of the RF attenuation value. Regarding AI section output 25, when an exemplary characterization is complete and the data has been plotted, a straight line curve fit for the linear portion only of the data may yield a slope of approximately 0.134+/−0.004 V/dB. This slope should remain the same regardless of the RF attenuation value. In one embodiment, if one or more resistor values of the resistors within AI section 25 are changed then a new slope will be generated and a re-characterization will have to be performed. In one embodiment, dynamic range may be defined as the linear region of an exemplary voltage characterization curve. In one aspect of this embodiment, Tx OTA probe 10 may have a dynamic range of approximately 60 dB wherein changes or modifications to Tx OTA probe 10 may result in an increase or decrease of the dynamic range and a need to perform re-characterization.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure. The benefits, advantages, solutions to problems, and any element(s) that may cause any benefit, advantage, or solution to occur or become more pronounced are not to be construed as critical, required, or essential features or elements of any or all the claims. The disclosure is defined solely by the appended claims including any amendments made during the pendency of this application and all equivalents of those claims as issued. Although the invention has been described in detail with reference to certain preferred embodiments, variations and modifications exist within the spirit and scope of the invention as described and defined in the following claims.

The invention claimed is:

1. A system adapted for use with an electromagnetic transmitter and receiver system, comprising:
    an electromagnetic transmitter and receiver system comprising an antenna, wherein the electromagnetic transmitter and receiver system is adapted to produce a transmitted radio frequency ("RF") signal for antenna pattern measurement which is transmitted through the antenna;
    at least one measurement probe disposed inside a case, the at least one measurement probe including a plurality of electronic components adapted to perform one or more antenna pattern measurements such that an RF signal emission pattern of the transmitted RF signal is not actively distorted;
    wherein the case, with the probe dispose therein, is located at first distance from the electromagnetic transmitter, the first distance not exceeding a dynamic range associated with an energy characteristic of the RF signal provided by the electromagnetic transmitter and measured by the at least one measurement probe, wherein the dynamic range includes a threshold distance in which the transmitted RF signal is detectable by the at least one measurement probe;
    an output section coupled to the at least one measurement probe, the output section adapted to send results indicating the antenna pattern measurement received by the at least one measurement probe to a remote location away from the electromagnetic transmitter and receiver system for recording and analysis, the analysis comprising producing an antenna pattern measurement for the electromagnetic transmitter and receiver system;
    wherein the receiver is adapted to produce the antenna pattern measurement to be read by an output signal analyzer configured to record and analyze the antenna pattern measurements.

2. The system of claim 1, wherein the at least one measurement probe comprises:
    a single printed circuit board ("PCB") including an integrated broadband antenna adapted to receive the transmitted RF signal;
    an RF attenuator configured to vary an input power level of the transmitted RF signal;
    a radio frequency detector;
    a demodulating logarithmic amplifier ("DLA") configured to convert the transmitted RF signal received by integrated broadband antenna into a decibel-scaled voltage signal; and
    an operational amplifier configured to invert and upscale the decibel-scaled voltage signal of the demodulating logarithmic amplifier;
    wherein the output signal analyzer is coupled to the PCB and adapted to analyze and record an output signal of the operational amplifier.

3. The system of claim 2, wherein the output signal analyzer includes at least one of an oscilloscope, a voltmeter, a data logger, and an analog to digital converter.

4. The system of claim 2, wherein the RF attenuator is an RF filter circuit.

5. A method of testing a transmitter output voltage signal over the air ("OTA") comprising:
    providing a device under test including a transmitter and at least one antenna;
    determining a dynamic range capacity of a measurement probe with respect to the device under test;
    determining a test location placement of the measurement probe with respect to the device under test based upon the dynamic range capacity and a predetermined range of output of the device under test wherein the test location placement is within the range such that the measurement probe will not receive a transmitted radio frequency ("RF") signal outside of the dynamic range capacity;
    operating the device under test and the measurement probe to produce a plurality of transmitter output voltage signals representing one or more antenna pattern measurements of an RF signal provided by the transmitter of the device under test;
    recording the transmitter output voltage signals using a output signal analyzer; and
    analyzing the recorded transmitter output voltage signals by comparing the actual transmitter output voltage signals to an expected transmitter output voltage signal to diagnose functionality of the transmitter.

6. The method of claim 5, wherein the measurement probe comprises:
    a single printed circuit board ("PCB") including an integrated broadband antenna adapted to receive the transmitted RF signal;
    an RF attenuator configured to vary an input power level of the transmitted RF signal;
    a radio frequency detector;
    a demodulating logarithmic amplifier ("DLA") configured to convert the transmitted RF signal received by integrated broadband antenna into a decibel-scaled voltage signal; and
    an operational amplifier configured to invert and upscale the decibel-scaled voltage signal of the demodulating logarithmic amplifier;
    wherein the output signal analyzer is coupled to the PCB and adapted to analyze and record an output signal of the operational amplifier.

7. The method of claim 6, wherein the RF attenuator is an RF filter circuit.

8. A method of testing a transmitter ("Tx") output voltage signal over-the-air ("OTA") comprising:
    designing a measurement probe comprising a single printed circuit board ("PCB") comprising:
        an integrated broadband antenna adapted to receive a transmitted radio frequency ("RF") signal energy;

an RF attenuator configured to modify an input power level of the transmitted RF signal energy;

a radio frequency detector;

a demodulating logarithmic amplifier configured to convert the RF signal energy received by the integrated broadband antenna to a decibel-scaled voltage signal;

an operational amplifier configured to invert and upscale the decibel-scaled voltage signal of the demodulating logarithmic amplifier; and a signal analyzer adapted to analyze an output signal of the operational amplifier;

providing a device under test including a transmitter and at least one antenna;

determining a dynamic range capacity of a measurement probe with respect to the device under test;

determining a test location placement of the a measurement probe with respect to the device under test based upon the dynamic range capacity and a predetermined range of output of the device under test, wherein the test location placement will be within the range such that the measurement probe will not receive a transmitted radio frequency ("RF") signal outside of the dynamic range capacity;

operating the device under test and the measurement probe to produce a plurality of transmitter output voltage signals representing one or more antenna pattern measurements of an RF signal provided by the transmitter of the device under test;

recording the transmitter output voltage signals using a output signal analyzer; and analyzing the recorded transmitter output voltage signals by comparing the actual transmitter output voltage signals to an expected transmitter output voltage signal to diagnose functionality of the transmitter.

9. The method of claim 8, wherein the output signal analyzer includes at least one of an oscilloscope, a voltmeter, a data logger, and an analog to digital converter.

10. A method of testing transmitter ("Tx") output voltage signals over-the-air ("OTA") comprising:

providing a measurement probe disposed on printed circuit board ("PCB");

placing the measurement probe at a first distance away from a device under test wherein the first distance is based on at least one of a dynamic range capacity and a predetermined range of a radio frequency ("RF") signal provided by a transmitter of the device under test;

wherein placement of the measurement probe does not exceed at least one of the dynamic range capacity and the predetermined range of the RF signal provided by the transmitter, wherein the measurement probe does not measure the transmitted RF signal if the first distance is outside of at least one of the dynamic range capacity and the predetermined range;

providing a direct current voltage to a first test point on the PCB;

setting a signal generator power level to −90 decibel-milliwatt ("dBm");

coupling a signal generator output to second test point on the PCB and providing an RF signal, by way of the signal generator, the RF signal having a desired frequency;

recording a voltage output signal measured by a signal analyzer at a third test point and at a fourth test point, wherein the signal analyzer includes at least one of an oscilloscope, a voltmeter, a data logger, and an analog to digital converter;

increasing the power level of a signal provided by the signal generator by a factor of 4 decibels ("dB") wherein at least one measurement is performed by the signal analyzer when the signal generator power level is set to +14 dBm; and producing a graph including the power with respect to the voltage for each voltage output signal measured at the third and fourth test points, the graph providing an RF signal power with respect to an RF signal voltage of the device under test.

11. The method of claim 10, wherein the direct current voltage ("VDC") provided to the first test point is 12 VDC.

12. The method of claim 10, wherein the signal generator power level is set at −90 dBm and is increased throughout the test by increments of 4 dB until a voltage output measurement is recorded when the signal generator power level is set at +14 dBm.

13. An electromagnetic transmitter and receiver system comprising:

a transmitter including a first antenna, the transmitter adapted to transmit a radio frequency ("RF") signal for antenna pattern measurement;

an enclosure device located at a first distance from the transmitter;

a receiver enclosed by the enclosure device, wherein the receiver is adapted to receive the transmitted RF signal for antenna pattern measurement;

a second antenna coupled to the receiver and comprising a first section and a second section, a plurality of first conductors supported by the first section and a plurality of second conductors supported by the second section, each of the conductors having a closed portion and an open portion wherein each first conductor on the first section is electrically coupled to at least one of the second conductors on the second section;

at least one measurement probe coupled to the receiver, the at least one measurement probe configured to perform antenna pattern measurement on the received RF signal without changing the emission pattern of the first and second antenna;

wherein placement of the enclosure device relative to the transmitter is based on a dynamic range associated with an RF signal energy transmitted by way of the first antenna such that the enclosure device is placed in proximity to the transmitter to ensure the RF signal is capable of detection by the second antenna; and a signal output section coupled to the receiver and adapted to send data signals from the receiver to a remote location for recording and analysis, the data signals indicating the antenna pattern measurement measured by the at least one measurement probe;

wherein the receiver includes at least one test point adapted to output one or more data signals corresponding to the antenna pattern measurement, the one or more data signals capable of being read by a signal analyzer.

14. The system of claim 13, wherein the analysis at the remote location includes producing at least one graph depicting graphical data corresponding to the antenna pattern measurement, the graphical data including at least one of a power and a voltage of the transmitted signal.

15. The system of claim 14, wherein the RF signal is an electromagnetic signal comprising a signal voltage characteristic and a signal power characteristic.

16. The system of claim 13, wherein the first conductor on the first section is electrically coupled to the second conductor on the section by way of a solder joint intermediate the open portion of the first conductor and the open portion of the second conductor.

17. The system of claim 16, wherein the antenna pattern measurement indicates the radiation pattern of the first antenna and comprises at least one of the relative magnitude, phase and voltage value of one or more electromagnetic RF signals.

18. The system of claim 13, wherein the first conductors of the first section are angled relative to the second conductors of the second section.

19. A transmitter ("Tx") Over-The-Air ("OTA") measurement probe comprising:
   a first antenna for receiving transmitted radio frequency ("RF") signal energy, the first antenna comprising a first section and a second section and a plurality of conductors supported by the first and second sections, the conductors having a closed portion and an open portion wherein a first conductor on the first section is electrically coupled to a second conductor on the second section;
   a printed circuit board ("PCB") electrically coupled to the first antenna, the PCB adapted to receive transmitted RF signal energy by way of the first antenna;
   a receiver circuit disposed on the PCB, the receiver circuit including:
      an RF attenuator configured to modify the input power level of the received RF signal energy;
      a demodulating logarithmic amplifier ("DLA") configured to convert the received RF signal energy from the first antenna into a decibel-scaled voltage signal;
      an operational amplifier configured to invert and upscale the output power of the DLA; and
      an signal output section adapted to output one or more data signals indicating the output signal of the operational amplifier, the data signals corresponding to an antenna pattern measurement of the transmitted RF signal energy; and
      wherein the signal output section is further adapted to send the one or more data signals from the receiver to a remote location for recording and analysis, the data signals indicating the antenna pattern measurement;
      wherein the receiver circuit includes at least one test point adapted to output the one or more data signals corresponding to the antenna pattern measurement, the one or more data signals capable of being read by a signal analyzer.

20. The Tx OTA measurement probe of claim 19, wherein the RF attenuator is configured to reduce a maximum input power level of the transmitted RF signal energy.

21. The Tx OTA measurement probe of claim 19, wherein the first antenna is an integrated broadband antenna that is integrated with the PCB by way of direct electrical coupling adjacent the PCB receiver circuit.

22. The Tx OTA measurement probe of claim 19, wherein the analysis at the remote location includes producing at least one graph depicting graphical data corresponding to the antenna pattern measurement, the graphical data including at least one of a power and a voltage of the transmitted signal.

23. The Tx OTA measurement probe of claim 22, wherein the RF signal is an electromagnetic signal comprising a signal voltage characteristic and a signal power characteristic.

24. The Tx OTA measurement probe of claim 23, wherein the antenna pattern measurement indicates the radiation pattern of the first antenna and comprises at least one of the relative magnitude, phase and voltage value of one or more electromagnetic RF signals.

25. A method of manufacturing an integrated broadband antenna comprising:
   providing a first antenna section including a first coupling slot;
   providing a second antenna section including a second coupling slot;
   fastening a first group of conductors to the first antenna section such that the first group of conductors are supported by the first antenna section and fastening a second group of conductors to the second antenna section such that the second group of conductors are supported by the second antenna section, a plurality of the conductors in the first and second groups each including a closed portion and an open portion;
   coupling, by way of the first coupling slot, the first antenna section to the second antenna section;
   coupling, by way of the second coupling slot, the second antenna section to the first antenna section;
   electrically coupling, by way of a plurality of solder joints, the plurality of conductors in the first group to the plurality of conductors in the second group, wherein each of the plurality of solder joints are intermediate the open portion of the first group of conductors and the open portion of the second group of conductors;
   wherein an angle between the first group of conductors and the second group of conductors does not exceed 90 degrees; and
   electrically coupling the first antenna section to a radio frequency ("RF") signal measuring circuit of a printed circuit board ("PCB") the measuring circuit including a measurement probe comprising:
      an RF attenuator configured to vary an input power level of the RF signal;
      a demodulating logarithmic amplifier ("DLA") configured to convert the RF signal into a decibel-scaled voltage signal; and
      an operational amplifier configured to invert and upscale the decibel-scaled voltage signal of the demodulating logarithmic amplifier.

26. The method of claim 25, further providing a third antenna section including a third coupling slot and the method further includes fastening a third group of conductors to the third antenna section such that the third group of conductors are supported by the third antenna section.

27. The method of claim 26, coupling, by way of the third coupling slot, the third antenna section to the first and second antenna sections.

28. The method of claim 25, electrically coupling, by way of a plurality of solder joints, the plurality of conductors in the third group to the plurality of conductors in the first group, and the plurality of conductors third group to the plurality of conductors in the second group, in wherein each of the plurality of solder joints are at least one of: intermediate the open portion of the third group of conductors and the open portion of the first group of conductors, and intermediate the open portion of the third group of conductors and the open portion of the second group of conductors.

29. The method of claim 28, wherein the first antenna section includes a top side and a bottom, wherein the first group of conductors comprise conductors fastened to the top side and conductors fastened to the bottom side; wherein the second antenna section includes a top side and a bottom, wherein the second group of conductors comprise conductors fastened to the top side and conductors fastened to the bottom side; and wherein the third antenna section includes a top side and a bottom, wherein the third group of conductors comprise conductors fastened to the top side and conductors fastened to the bottom side.

30. The method of claim 27, wherein the integrated broadband antenna is a quad-band antenna when the first antenna section is coupled to the second antenna section.

31. The method of claim 30, wherein the integrated broadband antenna is a hex-band antenna when the third antenna section is coupled to the first and second antenna sections.

* * * * *